United States Patent
Wilson et al.

(10) Patent No.: US 9,736,154 B2
(45) Date of Patent: Aug. 15, 2017

(54) SYSTEM AND METHOD FOR INTEGRATING AN AUTHENTICATION SERVICE WITHIN A NETWORK ARCHITECTURE

(71) Applicant: NOK NOK LABS, INC., Palo Alto, CA (US)

(72) Inventors: Brendon J. Wilson, San Jose, CA (US); Davit Baghdasaryan, San Francisco, CA (US)

(73) Assignee: Nok Nok Labs, Inc., Palo Alto, CA (US)

(*) Notice: Subject to any disclaimer, the term of this patent is extended or adjusted under 35 U.S.C. 154(b) by 0 days.

(21) Appl. No.: 14/487,992

(22) Filed: Sep. 16, 2014

(65) Prior Publication Data
US 2017/0034168 A1 Feb. 2, 2017

(51) Int. Cl.
H04L 29/06 (2006.01)
(52) U.S. Cl.
CPC ...... *H04L 63/0884* (2013.01); *H04L 63/0272* (2013.01); *H04L 63/0281* (2013.01);
(Continued)
(58) Field of Classification Search
None
See application file for complete search history.

(56) References Cited

U.S. PATENT DOCUMENTS 5,280,527 A 1/1994 Gullman et al.
5,764,789 A 6/1998 Pare, Jr. et al.
(Continued)

FOREIGN PATENT DOCUMENTS

WO 2005003985 A1 1/2005
WO WO2013/082190 6/2013

OTHER PUBLICATIONS

Notification of Transmittal of the International Search Report and the Written Opinion from counterpart Patent Cooperation Treaty Application No. PCT/US15/50348, mailed Dec. 22, 2015, 9 pages.
(Continued)

*Primary Examiner* — Trang Doan
(74) *Attorney, Agent, or Firm* — Nicholson De Vos Webster & Elliott LLP

(57) ABSTRACT

A system and method are described for integrating an authentication service within an existing network infrastructure. One embodiment of a method comprises: configuring a gateway to restrict access to an internal network; configuring an authentication client of a client device to establish a communication channel with the authentication server and to register one or more authentication devices with the authentication server; authenticating the user with the authentication server using one or more of the registered authentication devices in response to an attempt to gain access to the internal network via the gateway; providing the client device with a cryptographic data structure in response to a successful authentication; providing the cryptographic data structure to the gateway as proof of the successful authentication; validating the cryptographic data structure with the authentication server; providing access to the gateway upon receiving an indication from the authentication server that the cryptographic data structure is valid.

24 Claims, 11 Drawing Sheets

(52) U.S. Cl.
CPC .......... *H04L 63/08* (2013.01); *H04L 63/0807* (2013.01); *H04L 63/0823* (2013.01); *H04L 63/0838* (2013.01); *H04L 63/10* (2013.01)

(56) References Cited

U.S. PATENT DOCUMENTS

| | | | |
|---|---|---|---|
| 6,088,450 | A | 7/2000 | Davis et al. |
| 6,178,511 | B1 | 1/2001 | Cohen et al. |
| 6,377,691 | B1 | 4/2002 | Swift et al. |
| 6,618,806 | B1 | 9/2003 | Brown et al. |
| 6,751,733 | B1 | 6/2004 | Nakamura et al. |
| 6,842,896 | B1 | 1/2005 | Redding et al. |
| 6,938,156 | B2 | 8/2005 | Wheeler et al. |
| 7,155,035 | B2 | 12/2006 | Kondo et al. |
| 7,194,763 | B2 | 3/2007 | Potter et al. |
| 7,263,717 | B1 | 8/2007 | Boydstun et al. |
| 7,444,368 | B1 | 10/2008 | Wong et al. |
| 7,487,357 | B2 | 2/2009 | Smith |
| 7,512,567 | B2 | 3/2009 | Bemmel et al. |
| 7,698,565 | B1 | 4/2010 | Bjorn et al. |
| 7,865,937 | B1 | 1/2011 | White |
| 7,941,669 | B2 | 5/2011 | Foley et al. |
| 8,060,922 | B2 | 11/2011 | Crichton |
| 8,166,531 | B2* | 4/2012 | Suzuki .................. H04L 63/083 380/270 |
| 8,245,030 | B2 | 8/2012 | Lin |
| 8,284,043 | B2 | 10/2012 | Judd et al. |
| 8,291,468 | B1 | 10/2012 | Chickering |
| 8,353,016 | B1 | 1/2013 | Pravetz et al. |
| 8,359,045 | B1 | 1/2013 | Hopkins, III |
| 8,458,465 | B1 | 6/2013 | Stern et al. |
| 8,489,506 | B2 | 7/2013 | Hammad et al. |
| 8,516,552 | B2 | 8/2013 | Raleigh |
| 8,555,340 | B2 | 10/2013 | Potter et al. |
| 8,561,152 | B2 | 10/2013 | Novak et al. |
| 8,584,224 | B1 | 11/2013 | Pei et al. |
| 8,607,048 | B2 | 12/2013 | Nogawa |
| 8,646,060 | B1 | 2/2014 | Ben Ayed |
| 8,713,325 | B2 | 4/2014 | Ganesan |
| 8,719,905 | B2 | 5/2014 | Ganesan |
| 8,776,180 | B2 | 7/2014 | Kumar et al. |
| 8,856,541 | B1 | 10/2014 | Chaudhury et al. |
| 8,949,978 | B1* | 2/2015 | Lin .................. G06F 21/51 726/12 |
| 8,958,599 | B1 | 2/2015 | Starner |
| 8,978,117 | B2 | 3/2015 | Bentley et al. |
| 9,015,482 | B2 | 4/2015 | Baghdasaryan et al. |
| 9,032,485 | B2 | 5/2015 | Chu |
| 9,083,689 | B2 | 7/2015 | Lindemann et al. |
| 9,171,306 | B1 | 10/2015 | He et al. |
| 9,172,687 | B2 | 10/2015 | Baghdasaryan et al. |
| 9,396,320 | B2 | 7/2016 | Lindemann |
| 2002/0040344 | A1 | 4/2002 | Preiser et al. |
| 2002/0073316 | A1 | 6/2002 | Collins et al. |
| 2002/0073320 | A1 | 6/2002 | Rinkevich et al. |
| 2002/0087894 | A1 | 7/2002 | Foley et al. |
| 2002/0112170 | A1 | 8/2002 | Foley et al. |
| 2002/0174344 | A1 | 11/2002 | Ting |
| 2002/0174348 | A1 | 11/2002 | Ting |
| 2003/0055792 | A1 | 3/2003 | Kinoshita et al. |
| 2003/0065805 | A1 | 4/2003 | Barnes |
| 2003/0084300 | A1 | 5/2003 | Koike |
| 2003/0087629 | A1* | 5/2003 | Juitt .................. H04L 1/22 455/411 |
| 2003/0115142 | A1 | 6/2003 | Brickell et al. |
| 2003/0135740 | A1 | 7/2003 | Talmor et al. |
| 2003/0152252 | A1 | 8/2003 | Kondo |
| 2003/0226036 | A1 | 12/2003 | Bivens et al. |
| 2003/0236991 | A1 | 12/2003 | Letsinger |
| 2004/0101170 | A1 | 5/2004 | Tisse |
| 2004/0123153 | A1 | 6/2004 | Wright et al. |
| 2005/0021964 | A1 | 1/2005 | Bhatnagar et al. |
| 2005/0080716 | A1 | 4/2005 | Belyi et al. |
| 2005/0097320 | A1 | 5/2005 | Golan et al. |
| 2005/0125295 | A1 | 6/2005 | Tidwell et al. |
| 2005/0160052 | A1 | 7/2005 | Schneider |
| 2005/0187883 | A1 | 8/2005 | Bishop et al. |
| 2005/0223236 | A1 | 10/2005 | Yamada et al. |
| 2005/0278253 | A1 | 12/2005 | Meek et al. |
| 2006/0026671 | A1 | 2/2006 | Potter et al. |
| 2006/0029062 | A1* | 2/2006 | Rao .................. H04L 12/2856 370/389 |
| 2006/0156385 | A1 | 7/2006 | Chiviendacz et al. |
| 2006/0282670 | A1 | 12/2006 | Karchov |
| 2007/0005988 | A1 | 1/2007 | Zhang et al. |
| 2007/0077915 | A1 | 4/2007 | Black et al. |
| 2007/0088950 | A1 | 4/2007 | Wheeler et al. |
| 2007/0100756 | A1 | 5/2007 | Varma |
| 2007/0106895 | A1 | 5/2007 | Huang et al. |
| 2007/0107048 | A1 | 5/2007 | Halls et al. |
| 2007/0118883 | A1 | 5/2007 | Potter et al. |
| 2007/0165625 | A1 | 7/2007 | Elsner |
| 2007/0168677 | A1 | 7/2007 | Kudo |
| 2007/0169182 | A1 | 7/2007 | Wolfond |
| 2007/0198435 | A1 | 8/2007 | Siegal et al. |
| 2007/0239980 | A1 | 10/2007 | Funayama |
| 2007/0278291 | A1 | 12/2007 | Rans et al. |
| 2007/0286130 | A1 | 12/2007 | Shao et al. |
| 2008/0005562 | A1 | 1/2008 | Sather et al. |
| 2008/0025234 | A1 | 1/2008 | Zhu |
| 2008/0034207 | A1 | 2/2008 | Cam-Winget et al. |
| 2008/0046334 | A1 | 2/2008 | Lee et al. |
| 2008/0046984 | A1 | 2/2008 | Bohmer et al. |
| 2008/0049983 | A1 | 2/2008 | Miller et al. |
| 2008/0086759 | A1 | 4/2008 | Colson |
| 2008/0134311 | A1* | 6/2008 | Medvinsky .............. G06F 21/33 726/7 |
| 2008/0141339 | A1 | 6/2008 | Gomez et al. |
| 2008/0172725 | A1 | 7/2008 | Fujii et al. |
| 2008/0209545 | A1 | 8/2008 | Asano |
| 2008/0232565 | A1 | 9/2008 | Kutt et al. |
| 2008/0235801 | A1 | 9/2008 | Soderberg et al. |
| 2008/0271150 | A1 | 10/2008 | Boerger et al. |
| 2008/0289019 | A1 | 11/2008 | Lam |
| 2008/0313719 | A1 | 12/2008 | Kaliski, Jr. et al. |
| 2008/0320308 | A1 | 12/2008 | Kostiainen et al. |
| 2009/0049510 | A1 | 2/2009 | Zhang et al. |
| 2009/0064292 | A1 | 3/2009 | Carter et al. |
| 2009/0089870 | A1 | 4/2009 | Wahl |
| 2009/0100269 | A1 | 4/2009 | Naccache |
| 2009/0116651 | A1 | 5/2009 | Liang |
| 2009/0133113 | A1 | 5/2009 | Schneider |
| 2009/0138724 | A1 | 5/2009 | Chiou et al. |
| 2009/0138727 | A1 | 5/2009 | Campello |
| 2009/0158425 | A1 | 6/2009 | Chan et al. |
| 2009/0183003 | A1 | 7/2009 | Haverinen |
| 2009/0193508 | A1* | 7/2009 | Brenneman .......... G06Q 20/367 726/9 |
| 2009/0196418 | A1 | 8/2009 | Tkacik et al. |
| 2009/0199264 | A1 | 8/2009 | Lang |
| 2009/0204964 | A1 | 8/2009 | Foley |
| 2009/0235339 | A1 | 9/2009 | Mennes et al. |
| 2009/0271618 | A1 | 10/2009 | Camenisch et al. |
| 2009/0300714 | A1 | 12/2009 | Ahn |
| 2009/0307139 | A1 | 12/2009 | Mardikar et al. |
| 2009/0327131 | A1 | 12/2009 | Beenau et al. |
| 2009/0328197 | A1 | 12/2009 | Newell |
| 2010/0010932 | A1 | 1/2010 | Law et al. |
| 2010/0023454 | A1 | 1/2010 | Exton et al. |
| 2010/0029300 | A1 | 2/2010 | Chen |
| 2010/0042848 | A1 | 2/2010 | Rosener |
| 2010/0062744 | A1 | 3/2010 | Ibrahim |
| 2010/0070424 | A1 | 3/2010 | Monk |
| 2010/0082484 | A1 | 4/2010 | Erhart et al. |
| 2010/0083000 | A1 | 4/2010 | Kesanupalli |
| 2010/0094681 | A1 | 4/2010 | Almen et al. |
| 2010/0105427 | A1 | 4/2010 | Gupta |
| 2010/0107222 | A1 | 4/2010 | Glasser |
| 2010/0114776 | A1 | 5/2010 | Weller et al. |
| 2010/0169650 | A1 | 7/2010 | Brickell et al. |
| 2010/0175116 | A1 | 7/2010 | Gum |
| 2010/0186072 | A1 | 7/2010 | Kumar |
| 2010/0192209 | A1 | 7/2010 | Steeves et al. |
| 2010/0223663 | A1 | 9/2010 | Morimoto et al. |

(56) References Cited

U.S. PATENT DOCUMENTS

| | | |
|---|---|---|
| 2010/0242088 A1 | 9/2010 | Thomas |
| 2010/0287369 A1 | 11/2010 | Monden |
| 2010/0325664 A1 | 12/2010 | Grebenick et al. |
| 2010/0325684 A1 | 12/2010 | Grebenik |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1* | 4/2011 | Baghdasaryan ....... G06Q 20/10 705/75 |
| 2011/0083016 A1 | 4/2011 | Kesanupalli et al. |
| 2011/0107087 A1 | 5/2011 | Lee et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1* | 10/2011 | Ronda .................. H04L 63/0853 726/6 |
| 2011/0279228 A1 | 11/2011 | Kumar |
| 2011/0280402 A1 | 11/2011 | Ibrahim |
| 2011/0296518 A1 | 12/2011 | Faynberg et al. |
| 2011/0307706 A1 | 12/2011 | Fielder |
| 2011/0307949 A1 | 12/2011 | Ronda |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan |
| 2012/0144461 A1 | 6/2012 | Rathbun |
| 2012/0159577 A1 | 6/2012 | Belinkiy |
| 2012/0191979 A1 | 7/2012 | Feldbau |
| 2012/0203906 A1 | 8/2012 | Jaudon et al. |
| 2012/0204032 A1 | 8/2012 | Wilkins |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati |
| 2013/0046991 A1 | 2/2013 | Lu et al. |
| 2013/0054967 A1 | 2/2013 | Davoust et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson |
| 2013/0097682 A1* | 4/2013 | Zeljkovic .............. H04L 9/3231 726/7 |
| 2013/0104187 A1 | 4/2013 | Weidner |
| 2013/0104190 A1 | 4/2013 | Simske |
| 2013/0119130 A1 | 5/2013 | Braams |
| 2013/0124285 A1 | 5/2013 | Pravetz et al. |
| 2013/0125197 A1 | 5/2013 | Pravetz |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0167196 A1 | 6/2013 | Spencer et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0318343 A1 | 11/2013 | Bjarnason et al. |
| 2013/0337777 A1 | 12/2013 | Deutsch et al. |
| 2013/0346176 A1 | 12/2013 | Alolabi et al. |
| 2014/0007215 A1* | 1/2014 | Romano ............. H04L 63/0281 726/12 |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1* | 4/2014 | Barton .................. H04W 12/08 726/1 |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan |
| 2014/0189360 A1 | 7/2014 | Baghdasaryan |
| 2014/0189779 A1 | 7/2014 | Baghdasaryan |
| 2014/0189791 A1 | 7/2014 | Lindemann |
| 2014/0189807 A1 | 7/2014 | Cahill et al. |
| 2014/0189808 A1* | 7/2014 | Mahaffey ............ H04L 63/0853 726/4 |
| 2014/0189828 A1 | 7/2014 | Baghdasaryan |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289117 A1 | 9/2014 | Baghdasaryan |
| 2014/0289820 A1 | 9/2014 | Lindemann et al. |
| 2014/0289833 A1 | 9/2014 | Briceno et al. |
| 2014/0298419 A1* | 10/2014 | Boubez .................. H04L 63/08 726/4 |
| 2015/0046340 A1 | 2/2015 | Dimmick |
| 2015/0142628 A1 | 5/2015 | Suplee et al. |
| 2015/0180869 A1 | 6/2015 | Verma |
| 2015/0269050 A1 | 9/2015 | Filimonov |
| 2015/0326529 A1* | 11/2015 | Morita .................. H04L 63/02 726/12 |
| 2015/0381580 A1 | 12/2015 | Graham et al. |
| 2016/0072787 A1 | 3/2016 | Balabine et al. |
| 2016/0087952 A1 | 3/2016 | Tartz et al. |
| 2016/0087957 A1 | 3/2016 | Shah et al. |
| 2017/0004487 A1 | 1/2017 | Hagen et al. |

OTHER PUBLICATIONS

Anthony J. Nicholson, "Mobile Device Security Using Transient Authenticatio," IEEE Transactions on Mobile Computing vol. 5, No. 11, pp. 1489-1502 (Nov. 2006).

Mohammad O. Dewari, "Unobtrusive User-Authentication on Mobile Phones using Biometric Gait Recognition" (2010), 6 pages.

Niinuma, Koichiro, and Anil K. Jain. "Continuous user authentication using temporal information." *SPIE Defense, Security, and Sensing*. International Society for Optics and Photonics, 2010. (currently at http://www.cse.msu.edu/biometrics/Publications/Face/NiinumaJain_ContinuousAuth_SPIE10.pdf).

BehavioSec, "Measuring FAR/FRR/EER in Continuous Authentication," Stockholm, Sweden (2009), 8 pages.

(56) References Cited

OTHER PUBLICATIONS

The Online Certificate Status Protocol (OCSP, RFC2560), 24 pages.
See current WikiPedia article for "Eye Tracking" at en.wikipedia.org/wiki/Eye_tracking, 15 pages, Jun. 21, 2014.
(See Hartzell, "Crazy Egg Heatmap Shows Where People Click on Your Website" (Nov 30, 2012), currently at www.michaelhartzell.com/Blog/bid/92970/Crazy-Egg-Heatmap-shows-where-people-click-on-your-website).
Notification of Transmittal of the International Search Report and the Written Opinion from counterpart Patent Cooperation Treaty Application No. PCT/US13/77888, dated Aug. 8, 2014, 10 pages.
Notification of Transmittal of the International Search Report and the Written Opinion from counterpart Patent Cooperation Treaty Application No. PCT/US14/39627, dated Oct. 16, 2014, 3 pages.
Notification of Transmittal of the International Search Report and the Written Opinion from counterpart Patent Cooperation Treaty Application No. PCT/US14/31344, dated Nov. 3, 2014, 8 pages.
Office Action from U.S. Appl. No. 14/066,384, dated Jan. 7, 2015, 24 pages.
Office Action from U.S. Appl. No. 14/145,439, dated Feb. 12, 2015, 18 pages.
Office Action from U.S. Appl. No. 14/145,533, dated Jan. 26, 2015, 13 pages.
Office Action from U.S. Appl. No. 14/145,607, dated Mar. 20, 2015, 22 pages.
Office Action from U.S. Appl. No. 14/218,551, dated Apr. 23, 2015, 9 pages.
Office Action from U.S. Appl. No. 14/218,575, dated Feb. 10, 2015, 17 pages.
Office Action from U.S. Appl. No. 14/066,273, dated May 8, 2015, 31 pages.
Notice of Allowance from U.S. Appl. No. 14/145,533, dated May 11, 2015, 5 pages.
Notice of Allowance from U.S. Appl. No. 14/145,439, dated Jul. 6, 2015, 6 pages.
Transmittal of International Preliminary Report on Patentability from foreign counterpart PCT/US2013/077888, dated Jul. 9, 2015, 7 pages.
Office Action from U.S. Appl. No. 14/268,733, dated Jul. 16, 2015, 13 pages.
Notification of Transmittal of the International Search Report and the Written Opinion from counterpart Patent Cooperation Treaty Application No. PCT/US2015/028924, dated Jul. 30, 2015, 10 pages.
Office Action from U.S. Appl. No. 14/218,575, dated Aug. 7, 2015, 19 pages.
Final Office Action from U.S. Appl. No. 14/066,384, dated Aug. 20, 2015, 23 pages.
Office Action from U.S. Appl. No. 14/268,619, dated Aug. 24, 2015, 17 pages.
Notice of Allowance from U.S. Appl. No. 14/145,607, dated Sep. 2, 2015, 19 pages.
Final Office Action from U.S. Appl. No. 14/218,551, dated Sep. 9, 2015, 15 pages.
Notice of Allowance from U.S. Appl. No. 14/145,533, dated Sep. 14, 2015, 13 pages.
Notice of Allowance from U.S. Appl. No. 14/448,697, dated Sep. 15, 2015, 14 pages.
Notification of Transmittal of the International Search Report and the Written Opinion from counterpart Patent Cooperation Treaty Application No. PCT/US2015/042785, dated Oct. 16, 2015, 8 pages.
Notification of Transmittal of the International Search Report and the Written Opinion from counterpart Patent Cooperation Treaty Application No. PCT/US2015/042799, dated Oct. 19, 2015, 13 pages.
Office Action from U.S. Appl. No. 14/448,641, dated Nov. 9, 2015, 21 pages.
Barker et al; "Recommendation for key management Part 3: Application—Specific Key Management Guidance"; NIST special Publication 800-57, pp. 1-103, Dec. 2009.
Office Action from U.S. Appl. No. 14/448,814, dated Aug. 4, 2015, 13 pages.
World Wide Web, Consortium, W3C Working Draft: Media Capture and Streams (2013).
Office Action from U.S. Appl. No. 14/218,692, dated Nov. 4, 2015, 16 pages.
Notice of Allowance from U.S. Appl. No. 14/145,439, dated Oct. 28, 2015, 12 pages.
Brickell, Ernie, Jan Camenisch, and Liqun Chen. "Direct anonymous attestation." *Proceedings of the 11th ACM conference on Computer and communications security.* ACM, 2004, 6 pages.
Chen, Liqun, and Jiangtao Li. "Flexible and scalable digital signatures in TPM 2.0." *Proceedings of the 2013 ACM SIGSAC conference on Computer & communications security.* ACM, 2013.
Chakka, Murali Mohan, et al. "Competition on counter measures to 2-d facial spoofing attacks." *Biometrics (IJCB), 2011 International Joint Conference on.* IEEE, 2011, 6 pages.
Marcialis, Gian Luca, et al. "First international fingerprint liveness detection competition—livdet 2009." *Image Analysis and Processing—ICIAP 2009.* Springer Berlin Heidelberg, 2009. 12-23.
Uludag, Umut, and Anil K. Jain. "Attacks on biometric systems: a case study in fingerprints." *Electronic Imaging 2004.* International Society for Optics and Photonics, 2004, 12 pages.
Ratha, Nalini K., Jonathan H. Connell, and Ruud M. Bolle. "An analysis of minutiae matching strength." *Audio-and Video-Based Biometric Person Authentication.* Springer Berlin Heidelberg, 2001, 7 pages.
Schneier, B., "Biometrics: Uses and Abuses". Aug. 1999. Inside Risks 110 (CACM 42, 8, Aug. 1999). http://www.schneier.com/essay-019.pdf.
Zhao, W., et al. "Face Recognition: A Literature Survey". ACM Computing Surveys, vol. 35, No. 4. Dec. 2003, pp. 399-458.
Abate, A., et al., "2D and 3D face recognition: A survey". Pattern Recognition Letters. 2007, 28, pp. 1885-1906.
GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.
Wilson, R., James. Unbuntu Life, "How To Trick Google's New Face Unlock On Android 4.1 Jelly Bean". Print Screen Mac. [Online] Aug. 6, 2012. [Cited: Sep. 28, 2012.] http://printscreenmac.info/how-to-trick-android-jelly-bean-face-unlock/. downloaded Aug. 13, 2015.
Phillips, P., J., et al., "Face Recognition Vendor Test 2002: Evaluation Report". s.l. : NISTIR 6965, 2002. 56 pages. http://www.face-rec.org/vendors/FRVT_2002_Evaluation_Report.pdf.
Phillips, P.J., et al., "FRVT 2006 and ICE 2006 Large-Scale Results", NIST IR 7408. Gaithersburg : NIST, 2006. Mar. 29, 2007. pp. 1-55.
Grother, P.J., et al., NIST. Report on the Evaluation of 2D Still-Image Face Recognition Algorithms, NIST IR 7709. s.l. : NIST, 2011. Jun. 22, 2010. pp. 1-58.
Ratha, N., et al., IBM Thomas J. Watson Research Center. An Analysis of Minutiae Matching Strength P. Hawthorne, NY 10532 : IBM. 7 pages. http://pdf.aminer.org/000/060/741/an_analysis_of_minutiae_matching_strength.pdf.
Roberts, C., "Biometric Attack Vectors and Defences". Sep. 2006. 25 pages. http://otago.ourarchive.ac.nz/bitstream/handle/10523/1243/BiometricAttackVectors.pdf.
Pinto, A., et al., "Video-Based Face Spoofing Detection through Visual Rhythm Analysis". Los Alamitos : IEEE Computer Society Conference Publishing Services, 2012. Conference on Graphics, Patterns and Images, 25. 8 pages.(SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
Li, J., et al., "Live Face Detection Based on the Analysis of Fourier Spectra". Biometric Technology for Human Identification. 2004, pp. 296-303.

(56) References Cited

OTHER PUBLICATIONS

Tan, X., et al., "Face Liveness Detection from A Single Image with Sparse Low Rank Bilinear Discriminative Model". s.l. : European Conference on Computer Vision, 2010. pp. 1-14.
Määttä, J., et al., "Machine Vision Group, University of Oulu", Finland. "Face Spoofing Detection From Single Images Using Micro-Texture Analysis". Oulu, Finland : IEEE, 2011. pp. 1-7. http://www.ee.oulu.fi/research/mvmp/mvg/files/pdf/131.pdf.
HeikkilÄ, M., et al., "A Texture-Based Method for Modeling the Background and Detecting Moving Objects". Oulu : IEEE, Jun. 22, 2005. Draft. 16 pages. http://www.ee.oulu.fi/mvg/files/pdf/pdf_662.pdf.
Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.
Kong, S., et al., "Recent advances in visual and infrared face recognition" —a review. Journal of Computer Vision and Image Understanding. Jun. 2005, vol. 1, 97, pp. 103-135.
Kollreider, K., et al., Halmstad University, SE-30118, Sweden. Evaluating Liveness by Face Images and the Structure Tensor. Halmstad, Sweden : s.n., 2005. http://citeseerx.ist.psu.edu/viewdoc/download?doi=10.1.1.62.6534&rep=rep1&type=pdf.
Smiatacz, M., et al., Gdansk University of Technology. Liveness Measurements Using Optical Flow for Biometric Person Authentication. Metrology and Measurement Systems. 2012, vol. XIX, 2. pp. 257-268.
Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.
Pan, G., et al., "Liveness Detection for Face Recognition". Recent Advances in Face Recognition. Vienna : I-Tech, 2008, Ch. 9, pp. 109-124, ISBN: 978-953-7619-34-3.
National Science & Technology Council's Subcommittee on Biometrics. Biometrics Glossary. 33 pages, Last updated Sep. 14, 2006. NSTC. http://www.biometrics.gov/documents/glossary.pdf.
Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview_EUSIPCO04.pdf.
Rodrigues, R.N., et al. Robustness of multimodal biometric fusion methods against spoof attacks. Journal of Visual Language and Computing. 2009. 11 pages, doi:10.1016/j.jvlc.2009.01.010; http://cubs.buffalo.edu/govind/papers/visual09.pdf.
Akhtar, Z., et al., "Spoof Attacks on Multimodal Biometric Systems". Alfarid. Singapore : IACSIT Press, Singapore, 2011. 2011 International Conference on Information and Network Technology IPCSIT. vol. 4. pp. 46-51. http://www.ipcsit.com/vol4/9-ICINT2011T046.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Lubin, G., et al., Business Insider. "16 Heatmaps That Reveal Exactly Where People Look". [Online] May 21, 2012. [Cited: Nov. 1, 2012.] pp. 1-21. http://www.businessinsider.com/eye-tracking-heatmaps-2012-5?op=1.
Huang, L., et al., "Clickjacking: Attacks and Defenses". s.l. : Usenix Security 2012, pp. 1-16, 2012. https://www.usenix.org/system/files/conference/usenixsecurity12/sec12-final39.pdf.
Willis, N., Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.
Chetty, G. School of ISE, University of Canberra, Australia. "Multilevel liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.
Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PervComp2012_draft.pdf.
Jafri, R., et al., "A Survey of Face Recognition Techniques. Journal of Information Processing Systems", vol. 5, No. 2, Jun. 2009. Jun. 2009, vol. 5, 2, pp. 41-68. http://www.cosy.sbg.ac.at/~uhl/face_recognition.pdf.
Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.
Phillips, P. J., et al., "Biometric Image Processing and Recognition". Chellappa. 1998. Eusipco .8 pages.
Zhou, et al., "Face Recognition from Still Images and Videos". University of Maryland, College Park, MD 20742. Maryland : s.n., Nov. 5, 2004. pp. 1-23, http://citeseerx.ist.psu.edu/viewdoc/download?doi=10.1.1.77.1312&rep=rep1&type=pdf.
Quinn, G.W., et al., NIST. "Performance of Face Recognition Algorithms on Compressed Images", NIST Inter Agency Report 7830. s.l. : NIST, Dec. 4, 2011.
The Extended M2VTS Database. [Online] [Cited: Sep. 29, 2012.] downloaded Jan. 28, 2015, 1 page; http://www.ee.surrey.ac.uk/CVSSP/xm2vtsdb/.
Schuckers, S., Schuckers SAC. "Spoofing and Anti-Spoofing Measures". Information Security Technical Report. Dec. 10, 2002, vol. 7, 4., pp. 56-62.
Schwartz, W., et al., "Face Spoofing Detection through Partial Least Squares and Low-Level Descriptors". s.l. : Intl. Joint Conference on Biometrics, 2011. pp. 1-8.
Edited by Kresimir Delac, Mislay Grgic and Marian Stewart Bartlett. s.l. : InTech, Jun. 1, 2008. http://cdn.intechopen.com/finals/81/InTech-Recent_advances_in_face_recognition.zip. ISBN 978-953-7619-34-3. Uploaded as Chapters 1-15.
Pan, G., et al., "Monocular camera-based face liveness detection by combining eyeblink and scene context" pp. 215-225. s.l. : Springer Science+Business Media, LLC, Aug. 4, 2010. http://www.cs.zju.edu.cn/~gpan/publication/2011-TeleSys-liveness.pdf.
Tronci, R, et al., "Fusion of multiple clues for photo-attack detection in face recognition systems". 09010 Pula (CA), Italy : s.n., 2011. pp. 1-6. http://prag.diee.unica.it/pra/system/files/Amilab_IJCB2011.pdf.
Rocha, A., et al., "Vision of the Unseen: Current Trends and Challenges in Digital Image and Video Forensics". s.l. : ACM Computing Surveys, 2010. http://www.wjscheirer.com/papers/wjs_csur2011_forensics.pdf.
Brickell, E., et al., Intel Corporation; Jan Camenish, IBM Research; Liqun Chen, HP Laboratories. "Direct Anonymous Attestation". Feb. 11, 2004, pp. 1-28. http://eprint.iacr.org/2004/205.pdf.
Linux.com, The source for Linux information. 2012. 3 pages, downloaded Jan. 28, 2015.
Kollreider, K., et al., "Non-instrusive liveness detection by face images". Image Vis. Comput. (2007). doi:10.1016/j.imavis.2007.05.004, Received Feb. 18, 2006, received in revised form, Jan. 24, 2007 and accepted May 22, 2007. 12 pages.
Notification of Transmittal of the International Search Report and the Written Opinion from counterpart Patent Cooperation Treaty Application No. PCT/US2015/042870, dated Oct. 30, 2015, 9 pages.
Notification of Transmittal of the International Search Report and the Written Opinion from counterpart Patent Cooperation Treaty Application No. PCT/US2015/42827, dated Oct. 30, 2015, 9 pages.
Validity, OSTP Framework, 24 pages, 2010.

(56) References Cited

OTHER PUBLICATIONS

Notice of Allowance from U.S. Appl. No. 14/268,686, dated Nov. 5, 2015, 23 pages.
Office Action from U.S. Appl. No. 14/487,992, dated Dec. 31, 2015, 12 pages.
Final Office Action from U.S. Appl. No. 14/268,619, dated Dec. 14, 2015, 10 pages.
Notification of Transmittal of International Search Report and Written Opinion from PCT/US2015/028927, dated Jul. 30, 2015, 12 pages.
Transmittal of International Preliminary Report On Patentability from foreign counterpart PCT Patent Application No. PCT/US2014/039627 dated Dec. 10, 2015, 8 pages.
Notice of Allowance from U.S. Appl. No. 14/448,697, dated Jan. 14, 2016, 23 pages.
Final Office Action from U.S. Appl. No. 14/268,733, dated Jan. 15, 2016, 14 pages.
Notice of Allowance from U.S. Appl. No. 14/145,533, dated Jan. 20, 2016, 12 pages.
Office Action from U.S. Appl. No. 14/218,743, dated Jan. 21, 2016, 12 pages.
Office Action from U.S. Appl. No. 14/218,551, dated Jan. 21, 2016, 11 pages.
Office Action from U.S. Appl. No. 14/218,575, dated Jan. 29, 2016, 25 pages.
Transmittal of International Preliminary Report On Patentability from foreign counterpart PCT Patent Application No. PCT/US2014/031344 dated Oct. 1, 2015, 9 pages.
Notice of Allowance from U.S. Appl. No. 14/145,607, dated Feb. 2, 2016, 28 pages.
Final Office Action from U.S. Appl. No. 14/448,814, dated Feb. 16, 2016, 14 pages.
Final Office Action from U.S. Appl. No. 14/066,273, dated Feb. 11, 2016, 29 pages.
Final Office Action from U.S. Appl. No. 14/218,692, dated Mar. 2, 2016, 24 pages.
Final Office Action from U.S. Appl. No. 14/218,646, dated Mar. 2, 2016, 23 pages.
Notice of Allowance from U.S. Appl. No. 14/145,439, dated Mar. 14, 2016, 17 pages.
Notice of Allowance from U.S. Appl. No. 14/066,384, dated Mar. 17, 2016, 40 pages.
Office Action from U.S. Appl. No. 14/268,619, dated Mar. 21, 2016, 7 pages.
Notice of Allowance from U.S. Appl. No. 14/268,686, dated Mar. 30, 2016, 38 pages.
Office Action from U.S. Appl. No. 14/218,551, dated May 12, 2016, 11 pages.
Office Action from U.S. Appl. No. 14/448,814, dated Jun. 14, 2016, 17 pages.
Office Action from U.S. Appl. No. 14/066,273, dated Jun. 16, 2016, 43 pages.
Notice of Allowance from U.S. Appl. No. 14/448,641, dated Jun. 7, 2016, 13 pages.
Office Action from U.S. Appl. No. 14/218,611, dated Jun. 16, 2016, 13 pages.
Office Action from U.S. Appl. No. 14/218,677, dated Aug. 2, 2016, 15 pages.
Final Office Action from U.S. Appl. No. 14/218,646, dated Aug. 11, 2016, 25 pages.
Final Office Action from U.S. Appl. No. 14/218,575, dated Jul. 7, 2016, 29 pages.
Requirement for Restriction/Election from U.S. Appl. No. 14/218,504 dated Aug. 16, 2016, 11 pages.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
Mang, "Security Verification of Hardware-enabled Attestation Protocols," IEEE, 2012, pp. 47-54.
Advisory Action from U.S. Appl. No. 13/730,791 dated Jan. 23, 2015, 4 pages.
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Delac K. et al., Eds., InTech, Jun. 1, 2008, Retrieved from the Internet:, ISBN 978-953-7619-34-3, Uploaded as Individual Chapters 1-15, 15 pages.
Doherty, et al., Internet Engineering Task Force (IETF), "Dynamic Symmetric Key Provisioning Protocol (DSKPP)", Dec. 2010, 105 pages.
Extended European Search Report for Application No. 13867269, dated Nov. 4, 2016, 10 pages
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/218551 dated Sep. 16, 2016, 11 pages.
Final Office Action from U.S. Appl. No. 14/448,868 dated Aug. 19, 2016, 11 pages.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
Non-Final Office Action from U.S. Appl. No. 13/730,761 dated Feb. 27, 2014, 24 pages.
Non-Final Office Action from U.S. Appl. No. 13/730,761 dated Sep. 39, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/145466 dated Sep. 9, 2016, 13 pages.
Non-Final Office Action from U.S. Appl. No. 14/218,646 dated Mar. 10, 2016, 23 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.
Non-Final Office Action from U.S. Appl. No. 14/448,747 dated Aug. 19, 2016, 21 pages.
Non-Final Office Action from U.S. Appl. No. 14/448,868 dated Dec. 31, 2015, 12 pages.

(56) References Cited

OTHER PUBLICATIONS

Non-Final Office Action from U.S. Appl. No. 14/859,328 dated Sep. 15, 2016, 39 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,733 dated Sep. 23, 2016, 8 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notification of Transmittal of the International Search Report and the Written Opinion from counterpart Patent Cooperation Treaty Application No. PCT/US2015/042786, dated Oct. 16, 2015, 3 pages.
Ratha N.K., et al., "Enhancing Security and Privacy in Biometrics-Based Authentication Systems," IBM Systems Journal, 2001, vol. 40 (3), pp. 614-634.
Extended European Search Report for Application No. 14803988.6, dated Dec. 23, 2016, 10 pages.
Extended European Search Report from European Patent Application No. 14770682.4, dated Jan. 17, 2017, 14 pages.
Final Office Action from U.S. Appl. No. 14/066,273 dated Jan. 10, 2017, 24 pages.
Final Office Action from U.S. Appl. No. 14/218,611, dated Jan. 27, 2017, 14 pages.
Final Office Action from U.S. Appl. No. 14/218,692 dated Feb. 28, 2017, 27 pages.
Final Office Action from U.S. Appl. No. 14/218,743 dated Mar. 3, 2017, 57 pages.
Final Office Action from U.S. Appl. No. 14/448,747, dated Feb. 13, 2017, 74 pages.
Final Office Action from U.S. Appl. No. 14/859,328 dated Mar. 6, 2017, 26 pages.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Non-Final Office Action from U.S. Appl. No. 14/218,504, dated Feb. 27, 2017, 12 pages.
Non-Final Office Action from U.S. Appl. No. 14/218,677, dated Feb. 10, 2017, 18 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,733 dated Jan. 20, 2017, 62 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
Communication pursuant to Rules 161(2) and 162 EPC for EP Application No. 15826364.0, dated Mar. 7, 2017, 2 pages.
Final Office Action from U.S. Appl. No. 14/145,466, dated Apr. 13, 2017, 51 pages.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 dated May 18, 2017, 46 pages.
Non-Final Office Action from U.S. Appl. No. 14/218,575, dated May 4, 2017, 88 pages.
Non-Final Office Action from U.S. Appl. No. 14/218,646, dated Mar. 27, 2017, 24 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Notice of Allowance from U.S. Appl. No. 14/066,384, dated May 23, 2017, 50 pages.
Notice of Allowance from U.S. Appl. No. 14/448,868, dated Apr. 27, 2017, 52 pages.
Notice of Allowance from U.S. Appl. No. 14/448,868, dated Mar. 23, 2017, 57 pages.
TechTarget, What is network perimeter? Definition from WhatIs.com downloaded from http://searchnetworking.techtarget.com/definition/network-perimeter on Apr. 14, 2017, 5 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.

* cited by examiner though the term "processor" is used broadly in this application, the term "processor" is not intended to be limited to any particular kind of processor.

SYSTEM AND METHOD FOR INTEGRATING AN AUTHENTICATION SERVICE WITHIN A NETWORK ARCHITECTURE

BACKGROUND

Field of the Invention

This invention relates generally to the field of data processing systems. More particularly, the invention relates to a system and method for integrating an authentication service within a network architecture.

Description of Related Art

Systems have also been designed for providing secure user authentication over a network using biometric sensors. In such systems, the a score generated by an authenticator, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US Patent Applications, which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 Application"). These applications are sometimes referred to herein as the ("Co-pending Applications").

Briefly, the Co-Pending applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register/provision the authentication devices with one or more servers over a network (e.g., Websites or other relying parties equipped with secure transaction/authentication services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

The '504 Application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

Augmenting a Relying Party's web-based or other network enabled application to leverage the remote authentication techniques described in the co-pending applications typically requires the application to integrate directly with an authentication server. This poses a barrier to the adoption of such authentication, as Relying Parties will need to expend effort to update their applications to integrate with an authentication server in order to gain the authentication flexibility provided by the techniques described in the co-pending applications.

In some cases, the Relying Party may have already integrated with federation solutions, and thus a simple integration path is to simply integrate online authentication support into the federation solution. Unfortunately, this approach does not address other legacy systems (such as VPNs, Windows Kerberos deployments) that either lack awareness of federation protocols (and thus could be front-ended by a federation server augmented with online authentication functionality), or lack sufficient extensibility to enable direct integration of online authentication functionality. Hence, a key problem that must be solved for certain Relying Party applications is finding a way to enable them to integrate online authentication systems, without requiring the code for the applications themselves to be modified.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1A:
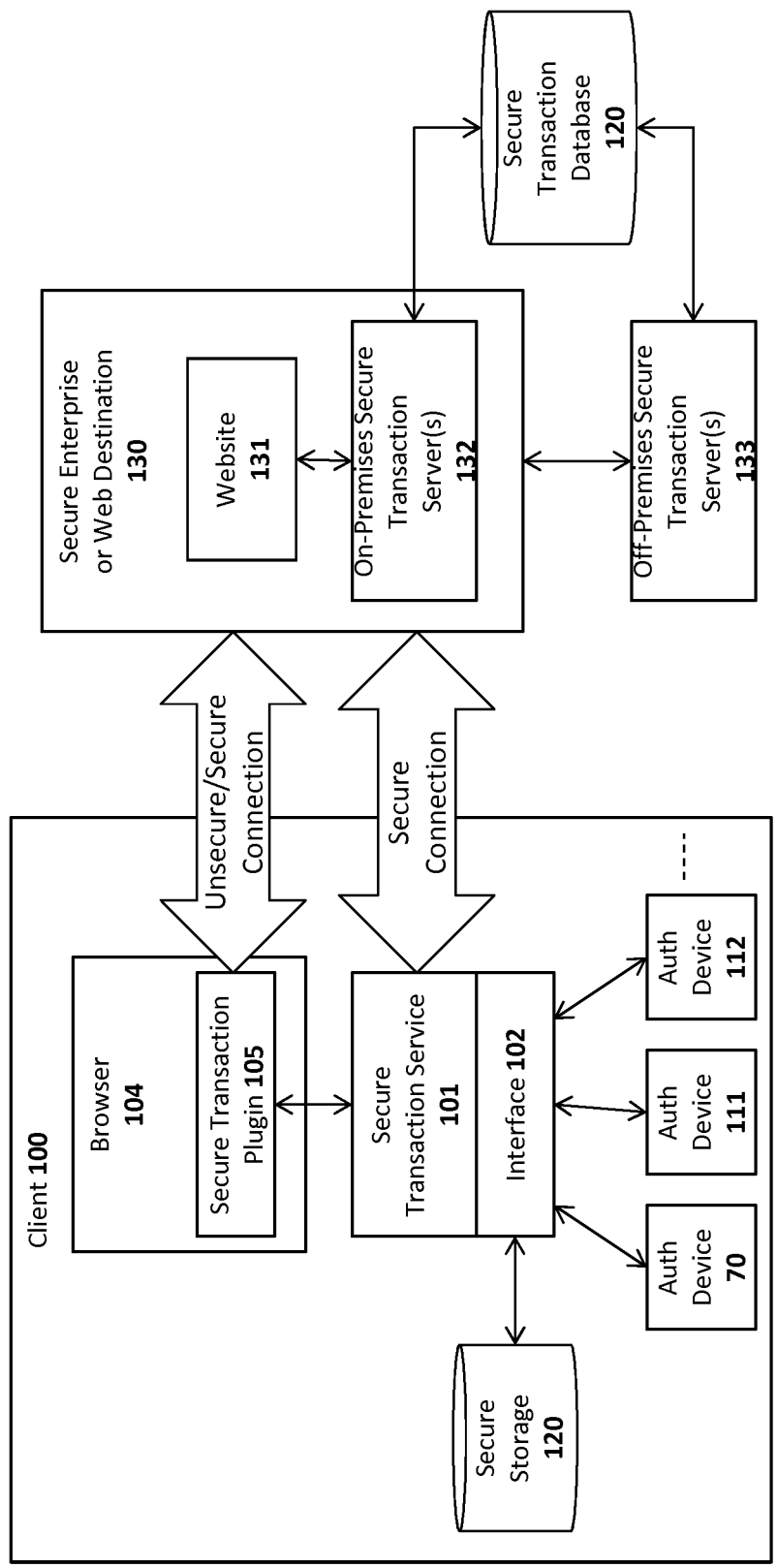
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers (sometimes referred to as "au implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary Online Authentication Architectures and Transactions

Figure 1B:
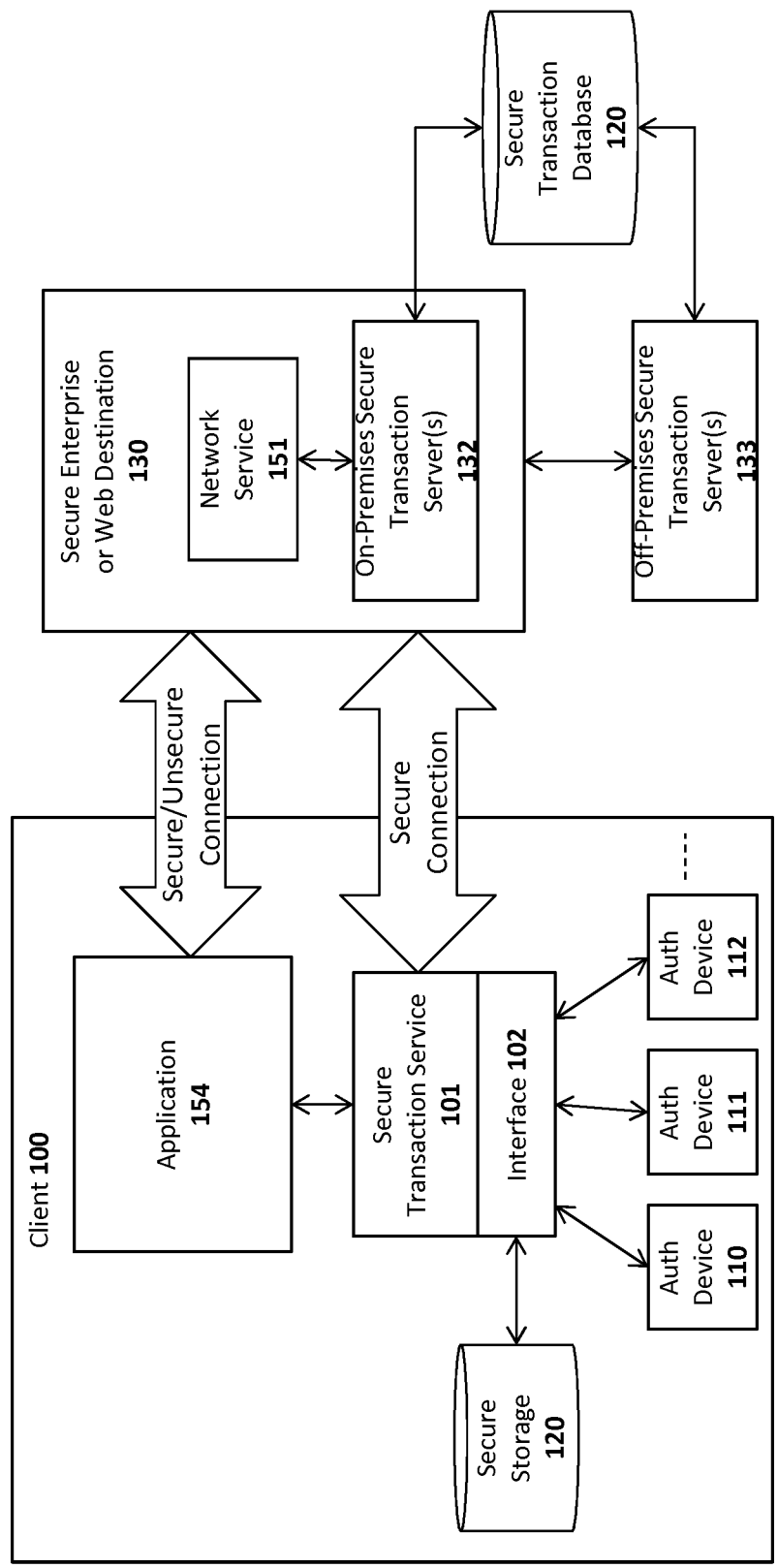

FIGS. 1A-B illustrate two embodiments of a system architecture comprising client-side and server-side components for registering authentication devices (also sometimes referred to as "provisioning") and authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by the authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Certain basic principles associated with remotely registering authentication devices and authenticating with a relying party will be described with respect to FIGS. 2-3, followed by a detailed description of embodiments of the invention for establishing trust using secure communication protocols.

Figure 2:
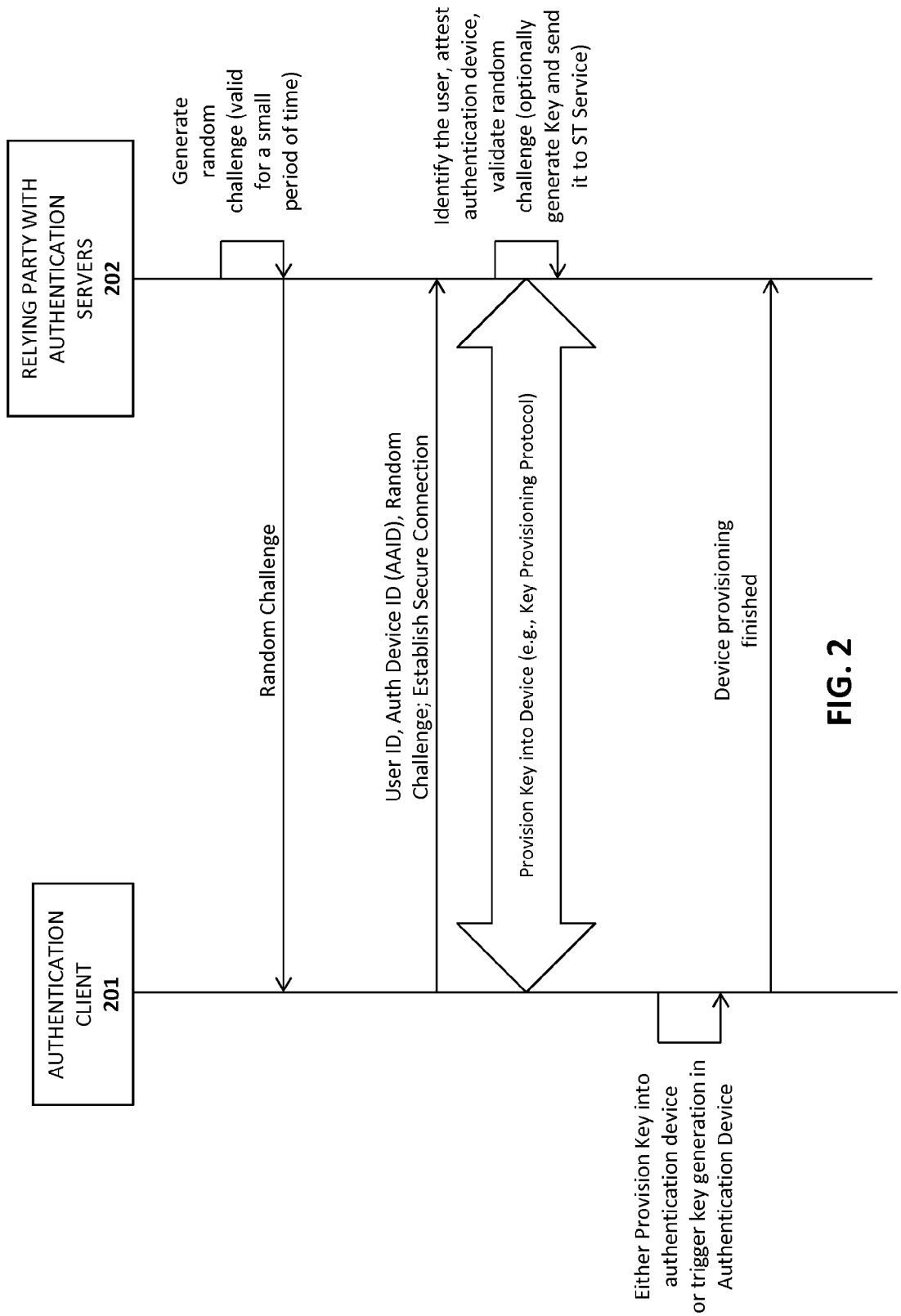
FIG. 2 is a transaction diagram showing how keys may be registered into authentication devices.

FIG. 2 illustrates a series of transactions for registering authentication devices on a client (such as devices 110-112 on client 100 in FIGS. 1A-B) (sometimes referred to as "provisioning" authentication devices). For simplicity, the secure transaction service 101 and interface 102 are combined together as authentication client 201 and the secure enterprise or web destination 130 including the secure transaction servers 132-133 are represented as a relying party 202.

During registration of an authenticator (e.g., a fingerprint authenticator, voice authenticator, etc), a key associated with the authenticator is shared between the authentication client 201 and the relying party 202. Referring back to FIGS. 1A-B, the key may be stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys are be used. In this embodiment, the public/private key pair may be generated by the secure transaction servers 132-133. The public key may then be stored by the secure transaction servers 132-133 and the related private key may be stored in the secure storage 120 on the client. In an alternate embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol is employed in one embodiment to share the key with the client over a secure communication channel. One example of a key provisioning protocol is the Dynamic Symmetric Key Provisioning Protocol (DSKPP) (see, e.g., Request for Comments (RFC) 6063). However, the underlying principles of the invention are not limited to any particular key provisioning protocol. In one particular embodiment, the client generates a public/private key pair and sends the public key to the server, which may be attested with an attestation key.

Turning to the specific details shown in FIG. 2, to initiate the registration process, the relying party 202 generates a randomly generated challenge (e.g., a cryptographic nonce) that must be presented by the authentication client 201 during device registration. The random challenge may be valid for a limited period of time. In response, the authentication client 201 initiates an out-of-band secure connection with the relying party 202 (e.g., an out-of-band transaction) and communicates with the relying party 202 using the key provisioning protocol (e.g., the DSKPP protocol mentioned above). To initiate the secure connection, the authentication client 201 may provide the random challenge back to the relying party 202 (potentially with a signature generated over the random challenge). In addition, the authentication client 201 may transmit the identity of the user (e.g., a user ID or other code) and the identity of the authentication device(s) to be provisioned registered (e.g., using the authentication attestation ID (AAID) which uniquely identify the type of authentication device(s) being provisioned).

The relying party locates the user with the user name or ID code (e.g., in a user account database), validates the random challenge (e.g., using the signature or simply comparing the random challenge to the one that was sent), validates the authentication device's authentication code if one was sent (e.g., the AAID), and creates a new entry in a secure transaction database (e.g., database 120 in FIGS. 1A-B) for the user and the authentication device(s). In one embodiment, the relying party maintains a database of authentication devices which it accepts for authentication. It may query this database with the AAID (or other authentication device(s) code) to determine if the authentication device(s) being provisioned are acceptable for authentication. If so, then it will proceed with the registration process.

In one embodiment, the relying party 202 generates an authentication key for each authentication device being provisioned. It writes the key to the secure database and sends the key back to the authentication client 201 using the key provisioning protocol. Once complete, the authentication device and the relying party 202 share the same key if a symmetric key was used or different keys if asymmetric keys were used. For example, if asymmetric keys were used, then the relying party 202 may store the public key and provide the private key to the authentication client 201. Upon receipt of the private key from the relying party 202, the authentication client 201 provisions the key into the authentication device (storing it within secure storage associated with the authentication device). It may then use the key during authentication of the user (as described below). In an alternate embodiment, the key(s) are generated by the authentication client 201 and the key provisioning protocol is used to provide the key(s) to the relying party 202. In either case, once provisioning is complete, the authentication client 201 and relying party 202 each have a key and the authentication client 201 notifies the relying party of the completion.

Figure 3:
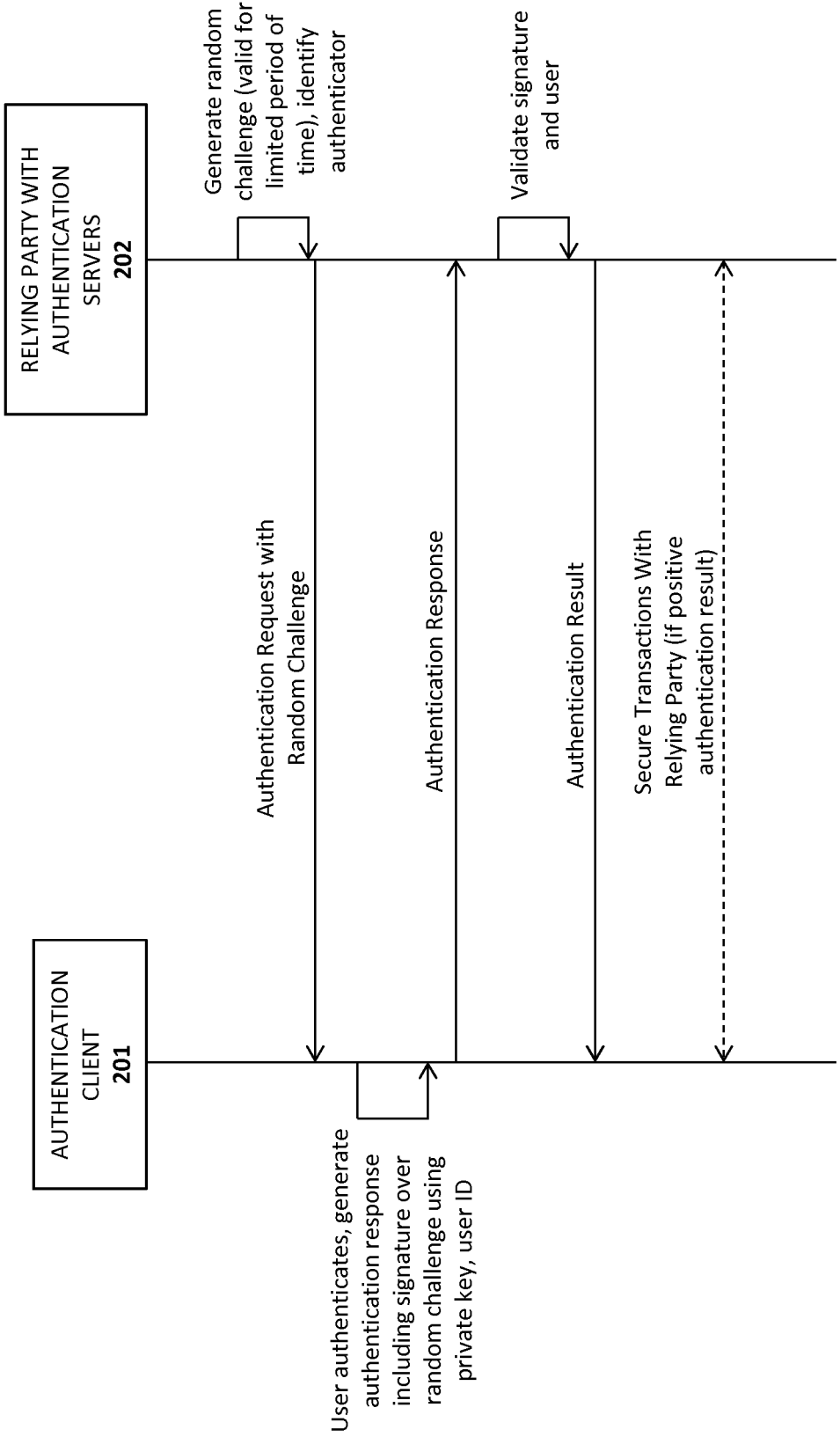
FIG. 3 illustrates a transaction diagram showing remote authentication.

FIG. 3 illustrates a series of transactions for user authentication with the provisioned authentication devices. Once device registration is complete (as described in FIG. 2), the relying party 202 will accept an authentication response (sometimes referred to as a "token") generated by the local authentication device on the client as a valid authentication response.

Turning to the specific details shown in FIG. 3, in response to the user initiating a transaction with the relying party 202 which requires authentication (e.g., initiating payment from the relying party's website, accessing private user account data, etc), the relying party 202 generates an authentication request which includes a random challenge (e.g., a cryptographic nonce). In one embodiment, the random challenge has a time limit associated with it (e.g., it is valid for a specified period of time). The relying party may also identify the authenticator to be used by the authentication client 201 for authentication. As mentioned above, the relying party may provision each authentication device available on the client and stores a public key for each provisioned authenticator. Thus, it may use the public key of an authenticator or may use an authenticator ID (e.g., AAID) to identify the authenticator to be used. Alternatively, it may provide the client with a list of authentication options from which the user may select.

In response to receipt of the authentication request, the user may be presented with a graphical user interface (GUI) requesting authentication (e.g., in the form of a web page or a GUI of an authentication application/app). The user then performs the authentication (e.g., swiping a finger on a fingerprint reader, etc). In response, the authentication client 201 generates an authentication response containing a signature over the random challenge with the private key associated with the authenticator. It may also include other relevant data such as the user ID code in the authentication response.

Upon receipt of the authentication response, the relying party may validate the signature over the random challenge (e.g., using the public key associated with the authenticator) and confirm the identity of the user. Once authentication is complete, the user is permitted to enter into secure transactions with the relying party, as illustrated.

A secure communication protocol such as Transport Layer Security (TLS) or Secure Sockets Layer (SSL) may be used to establish a secure connection between the relying party 201 and the authentication client 202 for any or all of the transactions illustrated in FIGS. 2-3.

System and Method for Integrating an Authentication Service with a Network Architecture Many legacy systems may feature support for an authentication methods other than usernames and passwords. For example, secure sockets layer (SSL) virtual private network (VPN) systems support the use of One Time Passwords (OTPs). Systems such as Kerberos allow the user to authenticate to a network or service using a digital certificate.

The embodiments of the invention described herein leverage these features to integrate an online authentication service with such legacy systems without requiring any changes to the legacy system itself (other than configuration changes).

To augment the security of secure socket layer (SSL) virtual private networks (VPNs), enterprises deploy second factor authentication solutions based on OTP approaches. Solutions such as RSA SecurID or OATH require the user to carry an OTP generator and input the OTP generated by this generator in combination with the username and password to authenticate to VPN.

Figure 4:
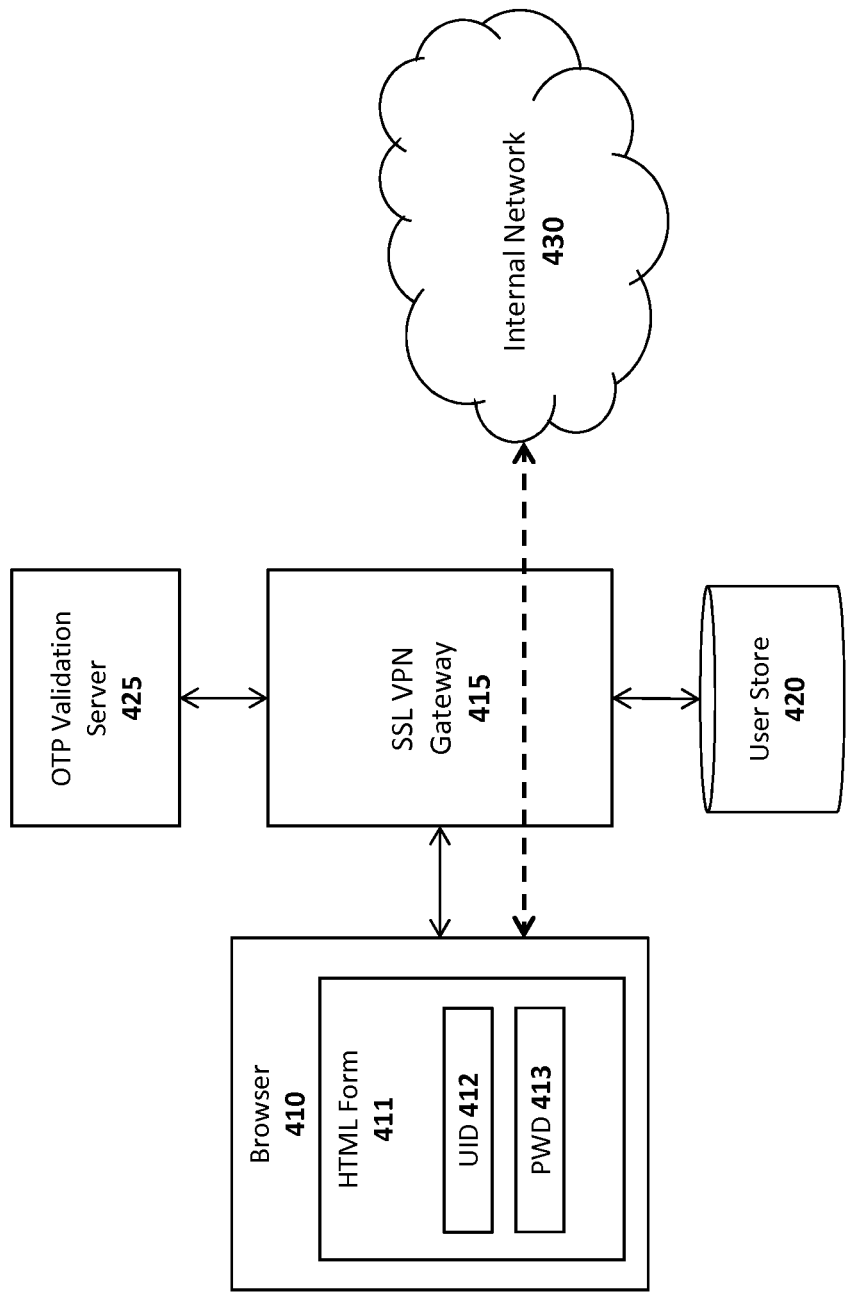
FIG. 4 illustrates a system for connecting a user to an internal network through a secure sockets layer (SSL) virtual private network (VPN) gateway.

FIG. 4 illustrates an OTP validation server 425 configured to operate in combination with an SSL VPN gateway 415. In operation, the user opens a web browser 410 and navigates to the SSL VPN gateway 415 which renders an HTML-based login form 411 containing a user ID field 412 and password field 413. The user may enter a user ID in the UID field 412 and the OTP in the password field 413 (either by itself or appended to the user's static password). After entering the user name and password via the HTML form 411, the user submits the results to the SSL VPN gateway 415.

The SSL VPN gateway 415 validates the username and password against a user store 420 (e.g., verifying the user name exists and that the correct password was entered) and validates the OTP by providing the OTP entered by the user to the OTP validation server 425. If the OTP validation server 425 provides an affirmative response, validating the OTP, the SSL VPN gateway 415 grants the user access to the protected internal network 430.

As mentioned, in the above example, the SSL VPN gateway 415 may render a separate form element to enable input of the OTP while, in other cases, the SSL VPN gateway 415 may simply rely on the user appending their OTP to the password in the form's password field. In addition, the SSL VPN gateway 415 may immediately reject access if the primary username and password are not accepted by the user store 420 validation. Communication between the SSL VPN gateway 415 and the OTP validation server 425 may be facilitated by a plugin provided by either the SSL VPN gateway vendor or the OTP validation server vendor. However the majority of SSL VPN gateways support Remote Authentication Dial In User Service (RADIUS; see RFC 2865) integration. Thus, RADIUS support by the OTP solution obviates the need for the OTP server provider to develop SSL VPN gateway-specific connectors.

Figure 5:
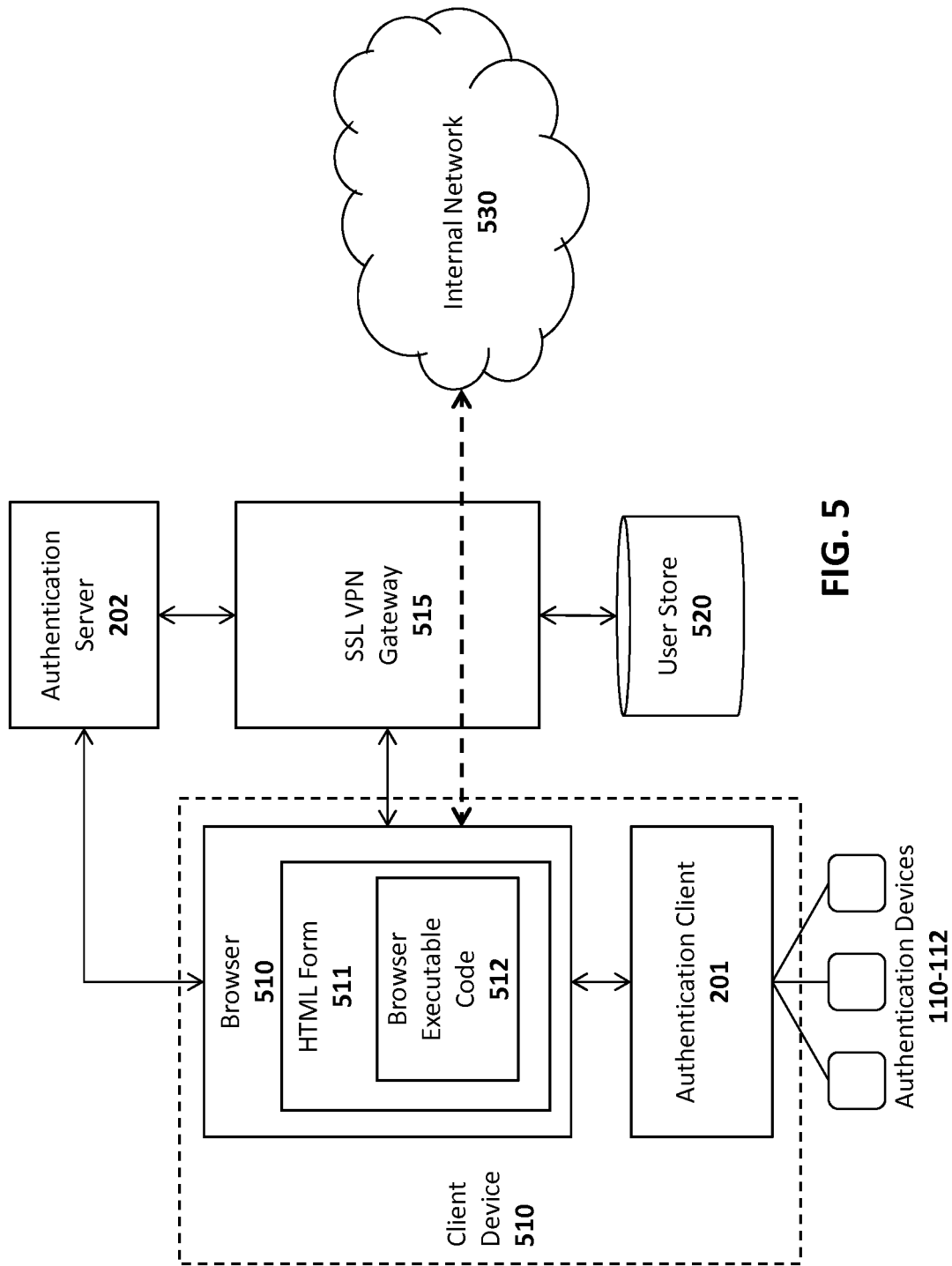
FIG. 5 illustrates one embodiment of a system for integrating an authentication server within a network infrastructure.

As illustrated in FIG. 5, one embodiment of the invention relies on existing features of the SSL VPN gateway 515 to integrate online authentication techniques (e.g., such as those described above with respect to FIGS. 1A-B and 3) without altering the network infrastructure. As illustrated, this embodiment includes an authentication server 202 communicatively coupled to the SSL VPN gateway 515, potentially in the same (or a similar) manner as the OTP validation server 425 described above. The authentication server 202 is also communicatively coupled to a client device 510 with an authentication client 201 for authenticating a user using one or more authentication devices 110-112 (e.g., fingerprint authenticators, voice authenticators, retinal scanning authenticators, etc). While the authentication server 202 is coupled to the authentication client 201 via a browser in FIG. 5 (e.g., in a similar manner as the embodiment shown in FIG. 1A), the underlying principles of the invention are not limited to a browser-based implementation.

In one embodiment, the interaction between the SSL VPN gateway 515, browser 510, and authentication server 202 is as follows. A user opens the web browser 510 and navigates to the SSL VPN gateway 515 which renders a web page 511 containing browser-executable code 512 such as JavaScript. In one embodiment, the browser-executable code 512 triggers authentication by establishing a communication channel with the authentication server 202 and triggering the authentication client 201 to authenticate the user. In one embodiment, the authentication server 202 and client 201 enter into a series of authentication transactions such as those described above with respect to FIG. 3. For example, the authentication server 202 may generate an authentication request which includes a random challenge (e.g., a cryptographic nonce) and may (or may not) identify the authenticator 110-112 to be used by the authentication client 201 for authentication. In response to receipt of the authentication request, the user may be presented with a graphical user interface (GUI) requesting authentication (e.g., in the form of a web page or a GUI of an authentication application/app). The user then performs the authentication (e.g., swiping a finger on a fingerprint reader, etc). In response, the authentication client 201 generates an authentication response containing a signature over the random challenge with the private key associated with the authenticator. It may also include other relevant data such as the user ID code in the authentication response. Upon receipt of the authentication response, the authentication server 202 validates the signature over the random challenge (e.g., using the public key associated with the authenticator) and confirms the identity of the user. In one embodiment, the JavaScript or other browser executable code 512 passes the above authentication messages between the authentication server 202 and authentication client 201.

In one embodiment, in response to a successful authentication, the authentication server 202 generates and passes a cryptographic data structure, referred to herein as a "ticket," to the browser 510. In one embodiment, the ticket comprises a random string of digits or other form of one time password (OTP) capable of being submitted to the SSL VPN gateway 515 via the fields of the HTML form 511. For example, as mentioned above, a separate field may be defined in the HTML form 511 for the ticket or the ticket may be appended to the end of the user's static password. Regardless of how the ticket is entered, in one embodiment, the JavaScript or other browser executable code 512 submits ticket to the SSL VPN gateway 515. Once received, the SSL VPN gateway 515 validates the ticket via communication with the authentication server 202 (e.g., providing the ticket to the authentication server and receiving a communication indicating that the ticket is valid). For example, upon receipt of the ticket and other user data from the SSL VPN gateway 515 (e.g., the user ID or other form of identifier), the authentication server 202 may compare the ticket with the ticket provided to the browser 510. If the tickets match, then the authentication server 202 sends an "authentication success" message to the SSL VPN gateway 515. If the tickets do not match, then the authentication server sends an "authentication failure" message to the SSL VPN gateway 515. In one embodiment, the SSL VPN gateway 515 validates the ticket against the authentication server 202 using RADIUS (although the underlying principles of the invention are not limited to any specific protocol). Once validated, the SSL VPN gateway 515 grants the user access to the protected internal network 530.

Significantly, the transactions between the SSL VPN gateway 515 and authentication server 202 may be implemented in the same manner (e.g., using the same protocols and data fields) as the success/failure messages provided by the OTP validation server 425. As a result, the SSL VPN gateway 515 does not need to be reconfigured to implement the embodiments of the invention described herein, thereby simplifying the implementation and reducing the time and expense associated therewith.

In the above approach, the SSL VPN login page 511 may be customized to include custom JavaScript or other browser executable code 512 to trigger the authentication. Of course, alternate embodiments may be implemented in the event that the user does not have the authentication client 201 installed.

In addition, communication with the SSL VPN gateway 515 by the JavaScript or other browser executable code 512 may be facilitated through the same HTML form 511 that the user would normally use to authenticate to the SSL VPN gateway 515. The goal would be to pass the ticket obtained by the JavaScript or other executable code using the existing password or OTP fields in the default SSL VPN's HTML form 511 (once again, simplifying and reducing the time and expense associated with implementing the above techniques).

Because these techniques address a well defined problem for a large number of VPN solutions without developing VPN-specific integrations, achieving this integration would require relatively little effort, and allow the authentication service provider (i.e., the entity managing the authentication server 202 and client 201) to provide a packaged solution for delivering secure remote access.

Figure 6:
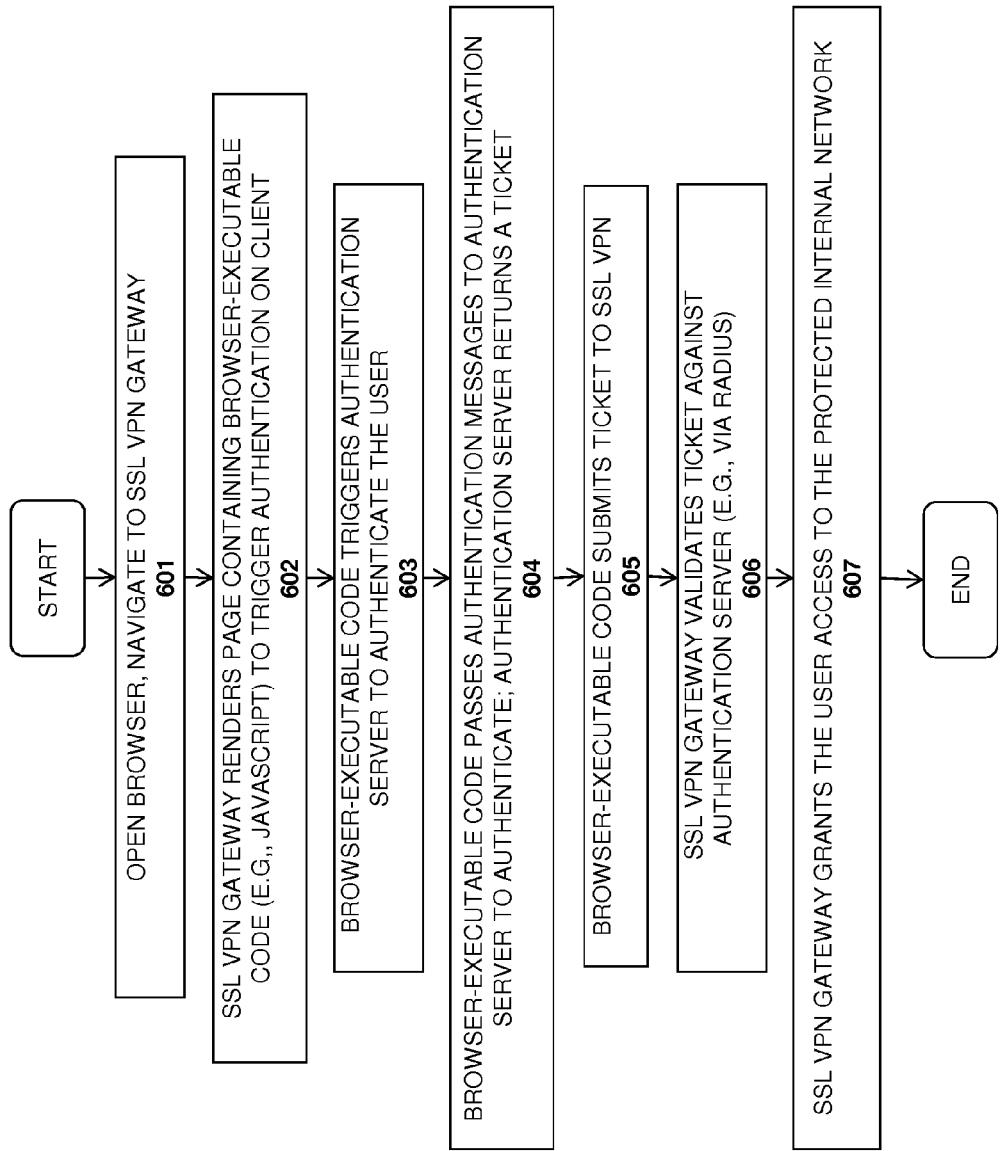
FIG. 6 illustrates one embodiment of a method for performing authentication using an authentication server integrated within a network infrastructure.

A method in accordance with one embodiment of the invention is illustrated in FIG. 6. The method may be implemented within the context of the architecture shown in FIG. 5, but is not limited to any specific system architecture.

At 601, the user opens a browser and navigates to the SSL VPN gateway. At 602, the SSL VPN gateway renders the page containing browser-executable code to trigger authentication on the client. At 603, the browser-executable code establishes a connection with an authentication server to trigger authentication of the user. At 604, the browser-executable code exchanges messages between the authentication client and authentication server to authenticate the user (see, e.g., description above with respect to FIGS. 1A-B, 3, and 5). Once authenticated, the authentication server returns a ticket.

At 605, the browser-executable code submits the ticket to the SSL VPN gateway and, at 606, the SSL VPN gateway validates the ticket against the authentication server. As mentioned above, this may involve the authentication server comparing the ticket to the ticket returned in operation 604 to confirm the validity of the ticket (e.g., via RADIUS). At 607, once the ticket is validated, the SSL VPN gateway grants the user access to the protected internal network.

An alternative approach to integrating with legacy systems is possible in cases where the legacy system accepts the use of digital certificates for authentication. These solutions, such as VPNs or Windows Active Directory using Kerberos, typically involve a client-side component to perform the certificate authentication.

Unlike the integration approach outlined above, where the integration on the client side was primarily browser-based (e.g., using JavaScript), in this embodiment, elements of the authentication client 201 are integrated into the legacy solution's client side software to achieve the integration; however, as before, no server-side integration is necessary.

Figure 7:
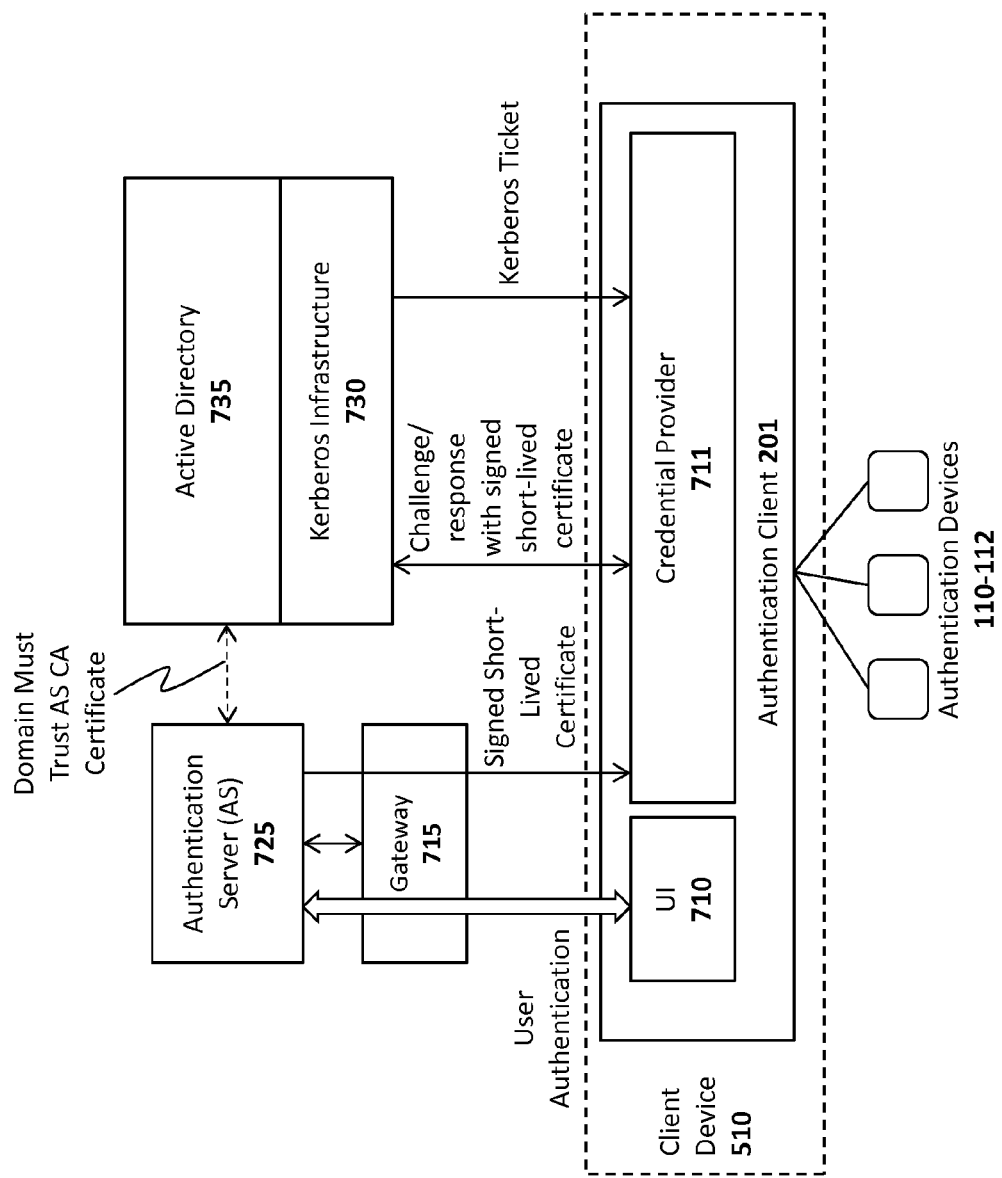
FIG. 7 illustrates one embodiment of a system for integrating an authentication server within a Kerberos infrastructure.

In the specific embodiment shown in FIG. 7, the authentication client 201 is equipped with a credential provider component 711 for managing signed certificates, which it uses to gain access to network resources via a Kerberos infrastructure 730. For example, in one embodiment, the authentication client 201 may be integrated into the Windows® operating system via the Credential Provider Framework using the credential provider component 730. It should be noted, however, that the underlying principles of the invention are not limited to a Kerberos implementation or any particular type of operating system.

This embodiment also relies on communication between the authentication server 725 and authentication client 201 which enter into a series of authentication transactions to authenticate the end user (e.g., as described above with respect to FIGS. 1B and 3). In one embodiment, the active directory 735 and Kerberos infrastructure 730 are configured to trust the root certificate held by the authentication server 725. Once the user is authenticated, the authentication server 725 issues a short-lived certificate comprising a cryptographic public/private key pair which it signs using a root certificate held by the authentication server 725 (e.g., signing the short-lived certificate with the private key of the root certificate). In particular, in one embodiment, the public key of the short-lived certificate is signed with the private key of the root certificate. In addition to the key pairs, the short-lived certificate may also include timestamp/timeout data indicating a length of time for which the short-lived certificate is valid (e.g., 5 minutes, 1 hour, etc).

In one embodiment, once the credential provider 711 receives the signed short-lived certificate from the authentication server, it enters into a challenge response transaction with the Kerberos infrastructure 730 involving the short-lived certificate. In particular, the Kerberos infrastructure sends a challenge (e.g., random data such as a nonce) to the credential provider 711 which then signs the challenge using the private key of the short-lived certificate. It then sends the short-lived certificate to the Kerberos infrastructure which (1) validates the signature on the short-lived certificate using the public key of the root certificate provided by the authentication server 725 (which it has been configured to trust); and (2) validates the signature over the challenge using the public key from the short-lived certificate. If both signatures are valid, then the Kerberos infrastructure issues a Kerberos ticket to the credential provider 711 which it may then use to gain access to network resources such as file servers, email accounts, etc, managed by the Kerberos infrastructure.

Using these techniques, the authentication server 725 and client 201 may be integrated without significant modification to the existing active directory 735 and Kerberos infrastructure 730. Rather, all that is required is that the active directory 735/Kerberos infrastructure are configured to trust the root certificate held by the authentication server 725.

Figure 8:
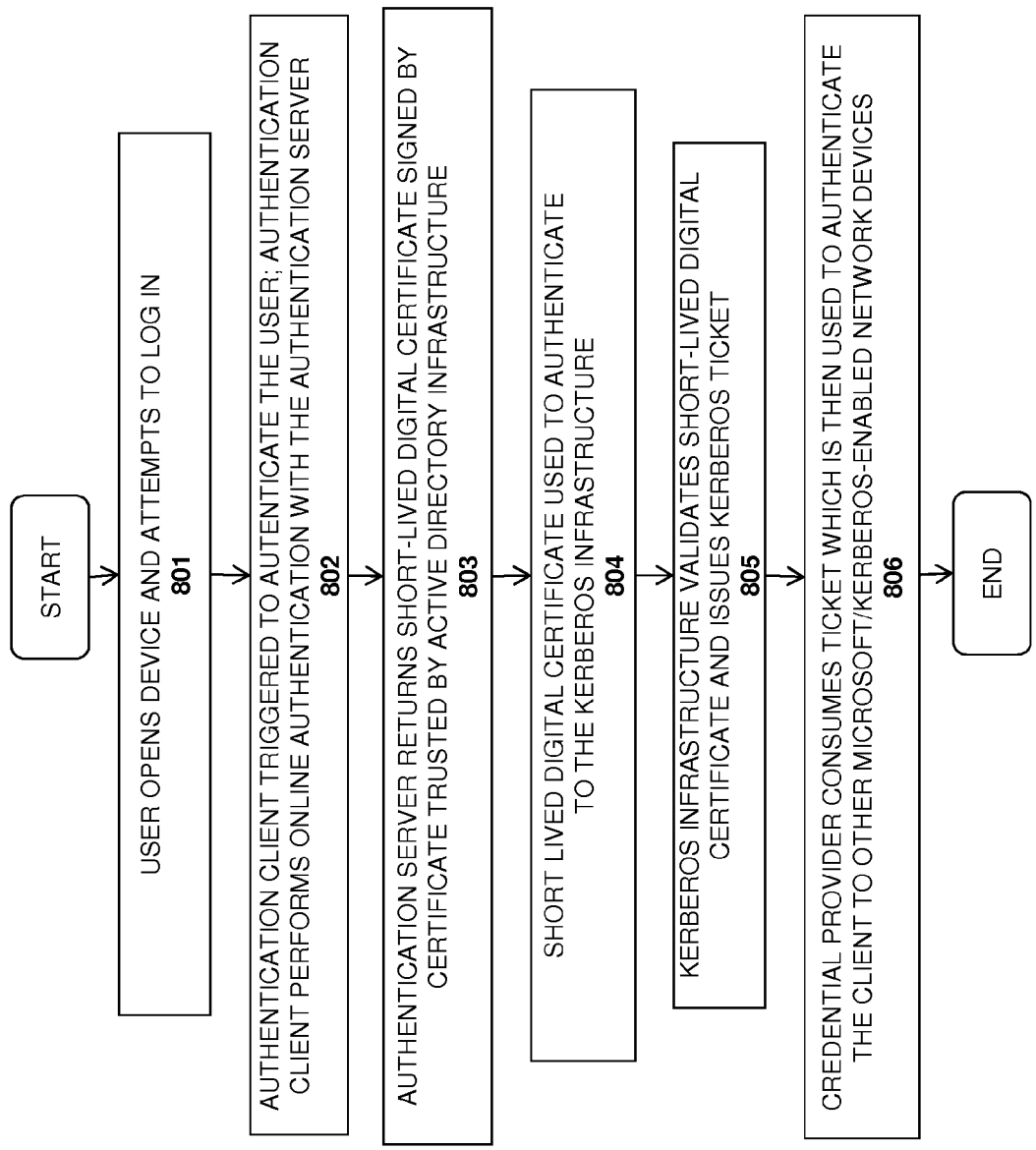
FIG. 8 illustrates one embodiment of a method for performing authentication using an authentication server integrated within a Kerberos infrastructure.

FIG. 8 illustrates one embodiment of a method for integrating an online authentication infrastructure with a legacy system. The method may be implemented within the context of the architecture shown in FIG. 7, but is not limited to any particular system architecture.

At 801, the user opens a device such as a Windows device and attempts to log in. At 802, an authentication client is triggered to authenticate the user. In response, the authentication client performs online authentication with an authentication server. For example, as discussed above, the authentication client may have previously registered one or more authentication devices with the server (e.g., a fingerprint authentication device, a voice authentication device, etc). It may then authenticate with the server using a series of transactions such as those described above with respect to FIGS. 1A-B and 3. For example, the authentication server may send the authentication client an authentication request with a random challenge, which the authentication client signs using a private key associated with the authentication device used. The authentication server may then use the public key to validate the signature.

Regardless of the specific protocol used for authentication, if authentication is successful, then at 803, the authentication server returns a short-lived digital certificate to the authentication client which is signed using a private key of a root certificate maintained by the authentication server. As mentioned, the root certificate is trusted by the active directory/Kerberos infrastructure.

At 804, the authentication client then uses the short-lived digital certificate to authenticate to the Kerberos infrastructure. For example, the Kerberos infrastructure may send a challenge (e.g., random data such as a nonce) to the authentication client which then signs the challenge using the private key of the short-lived certificate. It then sends the short-lived certificate to the Kerberos infrastructure which, at 805, validates the signature on the short-lived certificate using the public key of the root certificate provided by the authentication server (which it has been configured to trust); and validates the signature over the challenge using the public key from the short-lived certificate. If both signatures are valid, then the Kerberos infrastructure issues a Kerberos ticket to the authentication client which, at 806, it may then use to gain access to network resources such as file servers, email accounts, etc, managed by the Kerberos infrastructure.

The end result is that online authentication using an authentication server and authentication client may be used to front-end authentication for a legacy system, gaining all the flexibility of efficient online authentication, without requiring changes to the back end legacy application infrastructure.

Numerous benefits are realized through the embodiments of the invention described herein including, but not limited to:

Reduction in Initial Integration Effort:

Allows a Relying Party to deploy online authentication without re-writing their application to incorporate the online authentication functionality, or to enable integration with a third-party federation server.

Simplification of Policy Administration:

By expressing the authentication policy outside of code, this approach allows the organization to easily update their authentication policies without requiring code changes. Changes to reflect new interpretations of regulatory mandates, or to respond to attacks on existing authentication mechanisms become a simple change in the policy, and can be effected quickly.

Enablement of Future Refinement:

As new authentication devices and mechanisms become available, an organization can evaluate the appropriateness of the devices/mechanisms when addressing new or emerging risks. Integrating a newly-available authentication device only requires adding the device to a policy; no new code has to be written to deploy the new capability immediately, even to legacy applications.

Reduction in Direct Token Costs:

Legacy OTP approaches rely on physical hardware tokens that tend to be both relatively expensive on a per-user basis (though they are getting cheaper), and carry the problem of loss/breakage replacement costs. The online authentication approach described herein can dramatically reduce the deployment costs by leveraging capabilities already available on the end user's device, eliminating the cost of acquiring dedicated authentication hardware for each end user.

Indirect Deployment Costs:

OTP approaches typically require an IT administrator to provision the end user's token with the OTP validation server; software-based desktop OTP generators still require helpdesk intervention during initial deployment. The online authentication approach can dramatically reduce the deployment costs by leveraging capabilities already available on the end user's device, and delivering a self-service enrollment model for deployment.

Improved End User Experience:

OTP approaches require the user to not only carry their OTP generator (which many forget, resulting in additional helpdesk costs to enable temporary access) but also to manually input the OTP into the application. The FIDO approach can dramatically reduce the impact of authentication on the end user by replacing user name/password and OTP entry with something simpler, like swiping a finger over a fingerprint sensor.

Exemplary Data Processing Devices

Figure 9:
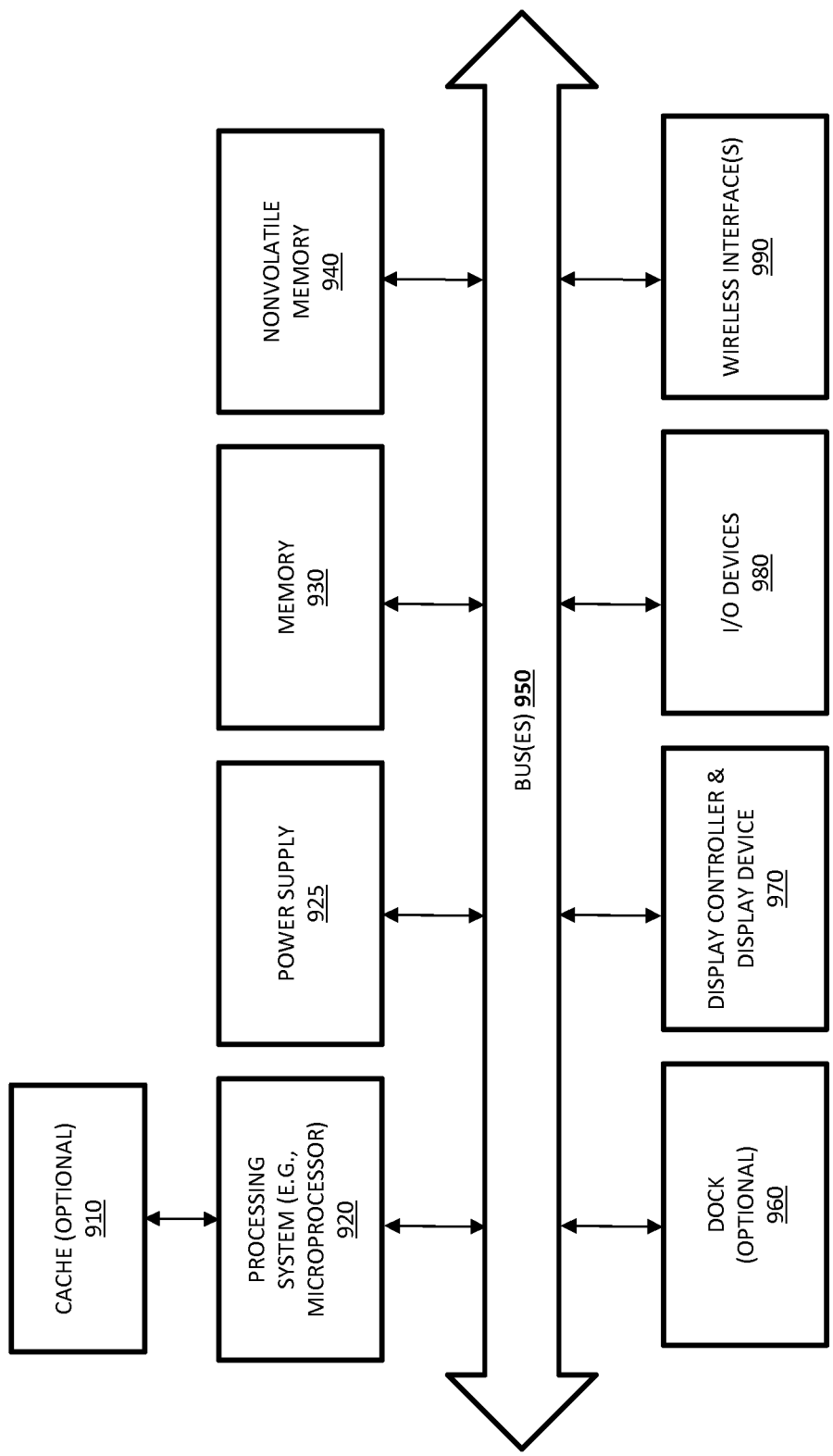
FIG. 9 illustrates one embodiment of a computer architecture used for servers and/or clients.

FIG. 9 is a block diagram illustrating an exemplary clients and servers which may be used in some embodiments of the invention. It should be understood that while FIG. 9 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 9, the computer system 900, which is a form of a data processing system, includes the bus(es) 950 which is coupled with the processing system 920, power supply 925, memory 930, and the nonvolatile memory 940 (e.g., a hard drive, flash memory, Phase-Change Memory (PCM), etc.). The bus(es) 950 may be connected to each other through various bridges, controllers, and/or adapters as is well known in the art. The processing system 920 may retrieve instruction(s) from the memory 930 and/or the nonvolatile memory 940, and execute the instructions to perform operations as described above. The bus 950 interconnects the above components together and also interconnects those components to the optional dock 960, the display controller & display device 990, Input/Output devices 980 (e.g., NIC (Network Interface Card), a cursor control (e.g., mouse, touchscreen, touchpad, etc.), a keyboard, etc.), and the optional wireless transceiver(s) 990 (e.g., Bluetooth, WiFi, Infrared, etc.).

Figure 10:
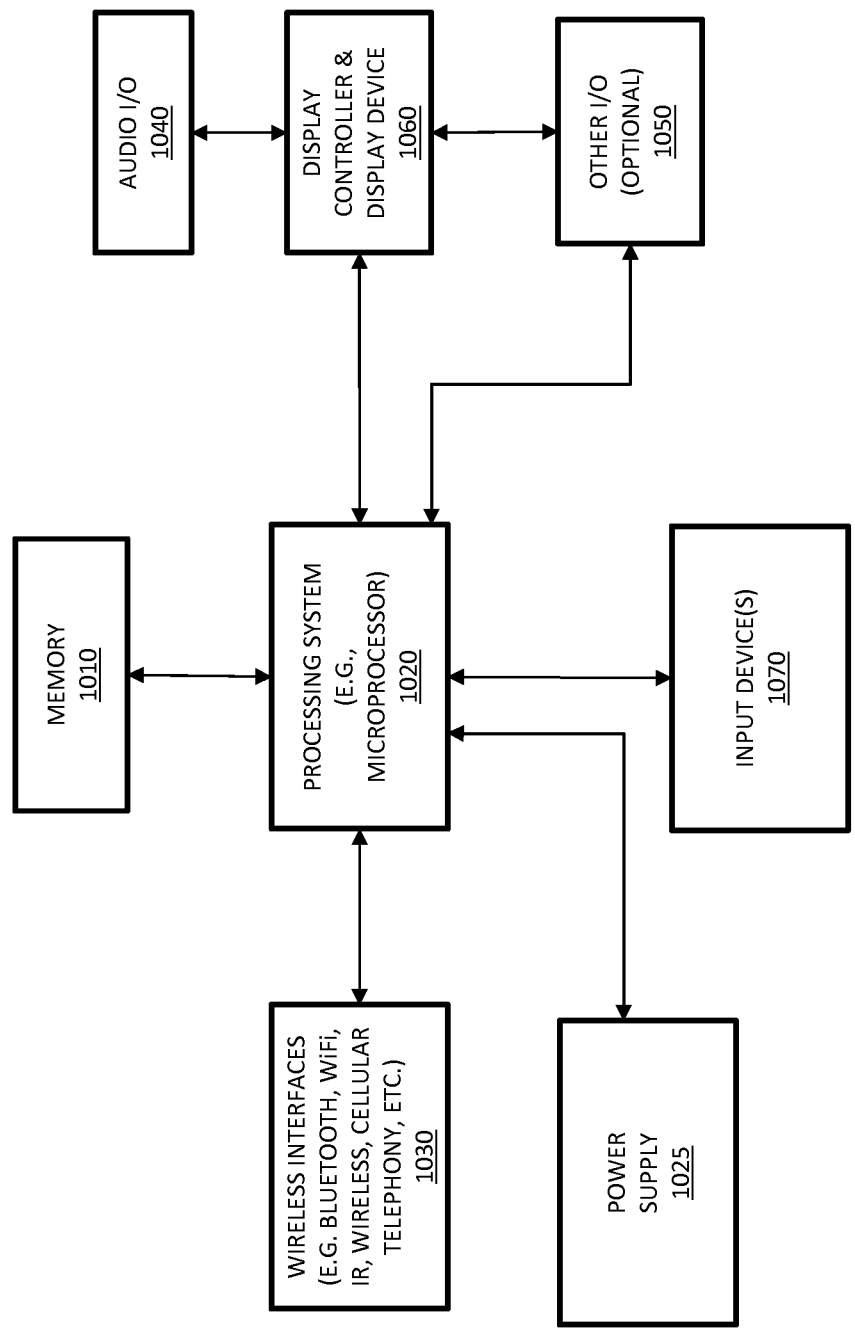
FIG. 10 illustrates one embodiment of a computer architecture used for servers and/or clients.

FIG. 10 is a block diagram illustrating an exemplary data processing system which may be used in some embodiments of the invention. For example, the data processing system 1000 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1000 may be a network computer or an embedded processing device within another device.

According to one embodiment of the invention, the exemplary architecture of the data processing system 1000 may used for the mobile devices described above. The data processing system 1000 includes the processing system 1020, which may include one or more microprocessors and/or a system on an integrated circuit. The processing system 1020 is coupled with a memory 1010, a power supply 1025 (which includes one or more batteries) an audio input/output 1040, a display controller and display device 1060, optional input/output 1050, input device(s) 1070, and wireless transceiver(s) 1030. It will be appreciated that additional components, not shown in FIG. 10, may also be a part of the data processing system 1000 in certain embodiments of the invention, and in certain embodiments of the invention fewer components than shown in FIG. 10 may be used. In addition, it will be appreciated that one or more buses, not shown in FIG. 10, may be used to interconnect the various components as is well known in the art.

The memory 1010 may store data and/or programs for execution by the data processing system 1000. The audio input/output 1040 may include a microphone and/or a speaker to, for example, play music and/or provide telephony functionality through the speaker and microphone. The display controller and display device 1060 may include a graphical user interface (GUI). The wireless (e.g., RF) transceivers 1030 (e.g., a WiFi transceiver, an infrared transceiver, a Bluetooth transceiver, a wireless cellular telephony transceiver, etc.) may be used to communicate with other data processing systems. The one or more input devices 1070 allow a user to provide input to the system. These input devices may be a keypad, keyboard, touch panel, multi touch panel, etc. The optional other input/output 1050 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

We claim:

1. A system comprising:
a gateway configured to restrict access to an internal network;
an authentication server communicatively coupled to the gateway;
a client device with an authentication client having a plurality of authentication devices coupled thereto for authenticating a user, the authentication client configured to establish a communication channel with the authentication server and to register one or more of the authentication devices with the authentication server, the authentication devices usable for performing online authentication with the authentication server following registration;
the authentication client to authenticate the user with the authentication server using one or more of the registered authentication devices in response to an attempt to gain access to the internal network via the gateway;
the authentication server to provide the client device with a cryptographic data structure in response to a successful authentication;
the client device to provide the cryptographic data structure to the gateway as proof of the successful authentication; and
the gateway to validate the cryptographic data structure with the authentication server, wherein upon receiving an indication from the authentication server that the cryptographic data structure is valid, the gateway to provide access by the client device to the internal network.

2. The system as in claim 1 further comprising:
a browser configured on the client device, wherein in response to an attempt by the user to access the internal network via the browser, the gateway provides browser-executable code which, when executed by the browser, triggers the authentication by establishing a communication channel between the authentication server and the authentication client.

3. The system as in claim 2 wherein the cryptographic data structure comprises a ticket.

4. The system as in claim 3 wherein the gateway is configured to provide the browser with an Hypertext Markup Language (HTML) form which includes the browser-executable code, the HTML form having one or more fields for entry of a user name and one or more passwords.

5. The system as in claim 4 wherein the ticket comprises a random string of digits or other form of one time password (OTP) capable of being submitted to the gateway via a field of the HTML form.

6. The system as in claim 1 wherein the authentication server validates the cryptographic data structure provided by the gateway using a key associated with the authentication device used for authentication.

7. The system as in claim 6 wherein the gateway validates the cryptographic data structure with the authentication server using a Remote Authentication DialIn User Service (RADIUS) protocol.

8. The system as in claim 1 wherein the gateway comprises a secure sockets layer (SSL) virtual private network (VPN) gateway.

9. A system comprising:
a network security infrastructure to provide network security services for an internal network;
an authentication server communicatively coupled to the existing network security infrastructure;
a client device with an authentication client having a plurality of authentication devices coupled thereto for authenticating a user, the authentication client configured to establish a communication channel with the authentication server and to register one or more of the authentication devices with the authentication server, the authentication devices usable for performing online authentication with the authentication server following registration;
the authentication client to authenticate the user with the authentication server using one or more of the registered authentication devices in response to an attempt to gain access to the internal network;
the authentication server to provide the client device with a cryptographic data structure in response to a successful authentication;
the client device to use the cryptographic data structure to authenticate with the network security infrastructure; and
the network security infrastructure to validate the cryptographic data structure based on a trust relationship established with the authentication server, the network security infrastructure to provide access by the client device to the internal network upon validation of the cryptographic data structure.

10. The system as in claim 9 wherein the cryptographic data structure comprises a digital certificate signed with a root certificate held by the authentication server, wherein the trust relationship comprises the network security infrastructure trusting signatures generated using the root certificate.

11. The system as in claim 10 wherein the digital certificate comprises a public/private key pair generated by the authentication server.

12. The system as in claim 11 wherein the digital certificate includes a timestamp or other data indicating a length of time for which the digital certificate is valid.

13. The system as in claim 12 wherein to use the digital certificate to authenticate with the network security infrastructure, the authentication client is to sign a challenge provided by the network security infrastructure.

14. The system as in claim 13 wherein the network security infrastructure is configured to validate the signature on the digital certificate using a public key of the root certificate provided by the authentication server with which it has the trust relationship; and is further configured to validate the signature over the challenge using a public key from the digital certificate.

15. The system as in claim 9 wherein the network security infrastructure comprises a Microsoft Active Directory and Kerberos infrastructure.

16. The system as in claim 9 further comprising:
a gateway coupling the authentication client to the authentication server.

17. A method comprising:
configuring a gateway to restrict access to an internal network;
communicatively coupling an authentication server to the gateway;
configuring an authentication client of a client device to establish a communication channel with the authentication server and to register one or more authentication devices with the authentication server, the authentication devices usable for performing online authentication with the authentication server following registration;
the authentication client to authenticate the user with the authentication server using one or more of the registered authentication devices in response to an attempt to gain access to the internal network via the gateway;
the authentication server to provide the client device with a cryptographic data structure in response to a successful authentication;
the client device to provide the cryptographic data structure to the gateway as proof of the successful authentication; and
the gateway to validate the cryptographic data structure with the authentication server, wherein upon receiving an indication from the authentication server that the cryptographic data structure is valid, the gateway to provide access by the client device to the internal network.

18. The method as in claim 17 wherein a browser is configured on the client device, wherein in response to an attempt by the user to access the internal network via the browser, the gateway provides browser-executable code which, when executed by the browser, triggers the authentication by establishing a communication channel between the authentication server and the authentication client.

19. The method as in claim 18 wherein the cryptographic data structure comprises a ticket.

20. The method as in claim 19 wherein the gateway is configured to provide the browser with an Hypertext Markup Language (HTML) form which includes the browser-executable code, the HTML form having one or more fields for entry of a user name and one or more passwords.

21. The method as in claim 20 wherein the ticket comprises a random string of digits or other form of one time password (OTP) capable of being submitted to the gateway via a field of the HTML form.

22. The method as in claim 17 wherein the authentication server validates the cryptographic data structure provided by the gateway using a key associated with the authentication device used for authentication.

23. The method as in claim 22 wherein the gateway validates the cryptographic data structure with the authentication server using a Remote Authentication Dial In User Service (RADIUS) protocol.

24. The method as in claim 17 wherein the gateway comprises a secure sockets layer (SSL) virtual private network (VPN) gateway.

* * * * *